US011742990B2

(12) United States Patent
Chendamarai Kannan et al.

(10) Patent No.: US 11,742,990 B2
(45) Date of Patent: Aug. 29, 2023

(54) ADAPTIVE HARQ FEEDBACK AND MULTI-THREADED HARQ TECHNIQUES FOR BUFFER MANAGEMENT

(71) Applicant: QUALCOMM Incorporated, San Diego, CA (US)

(72) Inventors: Arumugam Chendamarai Kannan, San Diego, CA (US); Xiaoxia Zhang, San Diego, CA (US); Vinay Chande, San Diego, CA (US); Tao Luo, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 312 days.

(21) Appl. No.: 17/035,424

(22) Filed: Sep. 28, 2020

(65) Prior Publication Data
US 2021/0143941 A1 May 13, 2021

Related U.S. Application Data

(60) Provisional application No. 62/934,451, filed on Nov. 12, 2019.

(51) Int. Cl.
*H04L 1/1812* (2023.01)
*H04B 17/336* (2015.01)
*H04L 1/1829* (2023.01)

(52) U.S. Cl.
CPC ......... *H04L 1/1812* (2013.01); *H04B 17/336* (2015.01); *H04L 1/1835* (2013.01)

(58) Field of Classification Search
CPC ... H04L 1/1812; H04L 1/1835; H04L 1/1854; H04L 1/1864; H04L 1/1671; H04L 1/1822; H04L 1/1825; H04B 17/336
See application file for complete search history.

(56) References Cited

U.S. PATENT DOCUMENTS

2003/0118031 A1* 6/2003 Classon ............... H04L 1/1845
370/395.54
2010/0050035 A1* 2/2010 Hong .................... H04L 1/1819
714/E11.131
(Continued)

FOREIGN PATENT DOCUMENTS

EP 3627740 A1 3/2020
WO 2015006640 A1 1/2015
(Continued)

OTHER PUBLICATIONS

International Search Report and Written Opinion—PCT/US2020/053320—ISA/EPO—dated Dec. 11, 2020.

*Primary Examiner* — Abdullahi Ahmed
(74) *Attorney, Agent, or Firm* — Loza & Loza, LLP

(57) ABSTRACT

The present disclosure discloses apparatuses, systems, and methods of wireless communication that use an adaptive hybrid automatic repeat request (HARQ) procedure and a multi-threaded HARQ procedure for improving HARQ buffer utilization and management. A user equipment (UE) can transmit a reset NACK to reduce the amount of HARQ buffers needed for concurrent HARQ processes. A base station can transmit different redundancy data in a HARQ retransmission depending on the types of NACK the UE transmitted. The base station can communicate with the UE using multiple light HARQ processes or threads that use less HARQ buffers than a typical HARQ procedure. Other aspects, features, and embodiments are also claimed and described.

35 Claims, 17 Drawing Sheets

(56) References Cited

U.S. PATENT DOCUMENTS

| | | | |
|---|---|---|---|
| 2018/0234359 A1* | 8/2018 | Hosseini | H04L 1/1835 |
| 2018/0278374 A1 | 9/2018 | Zeng et al. | |
| 2018/0287746 A1 | 10/2018 | Bergstrom et al. | |
| 2022/0217787 A1* | 7/2022 | Zhang | H04L 1/1861 |
| 2022/0255670 A1* | 8/2022 | Zhang | H04L 1/0004 |

FOREIGN PATENT DOCUMENTS

| | | |
|---|---|---|
| WO | 2018175084 A1 | 9/2018 |
| WO | 2019004536 A1 | 1/2019 |

\* cited by examiner

ADAPTIVE HARQ FEEDBACK AND MULTI-THREADED HARQ TECHNIQUES FOR BUFFER MANAGEMENT

PRIORITY CLAIM

This application claims priority to and the benefit of provisional patent application No. 62/934,451 filed in the United States Patent Office on Nov. 12, 2019, the entire content of which is incorporated herein by reference as if fully set forth below in its entirety and for all applicable purposes.

TECHNICAL FIELD

The technology discussed below relates generally to wireless communication systems, and more particularly, to wireless communication systems using hybrid automatic repeat request (HARQ) processes. Embodiments can provide and enable techniques for adaptive HARQ feedback and multi-threaded HARQ processes for buffer management.

INTRODUCTION

In wireless communication systems, hybrid automatic repeat request (HARQ) processes may be used in uplink and/or downlink transmissions. HARQ techniques aim to address communication errors that may occur during communications across the air. HARQ can use a stop and wait (SAW) protocol via a transmitter that waits to receive HARQ feedback from a receiver before transmitting another packet or retransmitting the same packet.

In some wireless communication systems like Long Term Evolution (LTE) and New Radio (NR) systems, multiple HARQ processes may occur concurrently between a base station and a user equipment (UE) during wireless communication. The base station controls the maximum number of concurrent HARQ processes between the base station and the UE. Longer HARQ processing time results in more concurrent HARQ processes between the base station and the UE, and the UE generally uses additional memory resources or HARQ buffers to support multiple concurrent HARQ processes.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Aspects of the present disclosure provide various improvements and advances to hybrid automatic repeat request (HARQ) processes applicable in wireless communication systems and methods. In some aspects, a user equipment (UE) can transmit a full negative acknowledgment (NACK) or a reset NACK in a HARQ process. In some aspects, the reset NACK can reduce the use of UE resources for maintaining HARQ buffers. In some aspects, the UE can transmit UE capability that indicates the UE's capability to use different HARQ buffers for supporting full NACK and/or reset NACK. In some aspects, a base station can transmit different redundancy versions of a HARQ retransmission. Redundant transmissions may, in some deployments, depend on whether the UE transmitted the full NACK or reset NACK. In some aspects, a light HARQ process may support multiple HARQ threads in which the UE stores the HARQ acknowledgement status of the threads without log likelihood ratios of received transmissions.

One aspect of the present disclosure provides a method of wireless communication at a user equipment (UE). The UE transmits, to a scheduling entity, a first HARQ response that includes a first negative acknowledgment (NACK) associated with a first data packet. The first NACK is configured to indicate that decoding values associated the first data packet are stored in a buffer configured to hold HARQ information. The UE transmits, to the scheduling entity, a second HARQ response that includes a reset NACK associated with a second data packet. The reset NACK is configured to indicate that decoding values associated with the second data packet are not stored in the buffer.

One aspect of the present disclosure provides a method of wireless communication operable at a scheduling entity. The scheduling entity transmits a first data packet to a UE and receive a first HARQ response from the UE. The first HARQ response includes a first NACK of the first data packet, and the first NACK indicates that decoding values of the first data packet are stored by the UE in a buffer configured to hold HARQ information. The scheduling entity transmits a second data packet to the UE and receive a second HARQ response from the UE. The second HARQ response includes a reset NACK of the second data packet, and the reset NACK indicates that decoding values of the second data packet are discarded by the UE.

One aspect of the present disclosure provides a wireless communication method. A wireless device receives at least one wireless communication packet from at least one other wireless entity using a HARQ process. The wireless device transmits a HARQ response to the other wireless entity without keeping decoding values associated with the wireless communication packet for later soft combining in the HARQ process. The HARQ response includes a reset NACK. In some aspects, the wireless device can determine not to store the decoding values in a buffer configured to store HARQ information, based on a plurality of factors.

In some aspects, the wireless device can receive, from the other wireless entity, a plurality of wireless communication packets using a light HARQ process including a plurality of light HARQ threads. The wireless device can transmit a HARQ feedback in each of the light HARQ threads without keeping corresponding decoding values of the plurality of wireless communication packets.

One aspect of the present disclosure provides a method of wireless communication using a hybrid automatic repeat request (HARQ) process. A scheduled entity (e.g., UE) receives, from a scheduling entity, a first data packet. The scheduled entity may transmit, to the scheduling entity, a first HARQ response comprising a full negative acknowledgment (NACK) of the first data packet. The scheduled entity may store decoding values of the first data packet in a HARQ buffer.

According to some aspects, decoding values may be 'soft' decisions in some cases and 'hard' decisions in some cases. Both type of decoding decisions may be used as desired, individually, and/or in combination. In some instances, soft decisions can be generated by or provided via a soft decoder and/or soft decision decoding method. A soft decoding value can be configured to indicates a likelihood or probability that a certain decoded bit is a binary one or zero, for example. To the contrary, a hard decision or hard decoding value positively identifies a decoded bit as one or zero. An example of soft decoding value is log-likelihood ratios (LLR).

The scheduled entity receives, from the scheduling entity, a second data packet. The scheduled entity transmits, to the scheduling entity, a second HARQ response comprising a reset NACK of the second data packet, without storing soft-decision decoding values of the second data packet.

Another aspect of the present disclosure provides a method of wireless communication using a HARQ process. A scheduling entity transmits, to a scheduled entity, a first data packet. The scheduling entity receives, from the scheduled entity, a first HARQ response comprising a full negative acknowledgment (NACK) of the first data packet. A full NACK can indicate memory status associated with soft-decision decoding values of the first data packet (e.g., whether values are stored by a scheduled entity). The scheduling entity transmits, to the scheduled entity, a second data packet. The scheduling entity receives, from the scheduled entity, a second HARQ response comprising a reset NACK of the second data packet. The reset NACK indicates that soft-decision decoding values of the second data packet are discarded by the scheduled entity.

Another aspect of the present disclosure provides a scheduled entity for wireless communication. The scheduled entity includes a communication interface configured to communicate with a scheduling entity using a HARQ process, a memory, and a processor operatively coupled to the communication interface and the memory. The processor and the memory are configured to receive, from the scheduling entity, a first data packet. The processor and the memory are further configured to transmit, to the scheduling entity, a first HARQ response comprising a full negative acknowledgment (NACK) of the first data packet. The processor and the memory are further configured to store soft-decision decoding values of the first data packet in a HARQ buffer. The processor and the memory are further configured to receive, from the scheduling entity, a second data packet. The processor and the memory are further configured to transmit, to the scheduling entity, a second HARQ response comprising a reset NACK of the second data packet, without storing soft-decision decoding values of the second data packet.

Another aspect of the present disclosure provides a scheduling entity for wireless communication. The scheduling entity includes a communication interface configured to communicate with a scheduled entity using a HARQ process, a memory, and a processor operatively coupled to the communication interface and the memory. The processor and the memory are configured to transmit, to the scheduled entity, a first data packet. The processor and the memory are further configured to receive, from the scheduled entity, a first HARQ response comprising a full negative acknowledgment (NACK) of the first data packet. The full NACK is configured to indicate that soft-decision decoding values of the first data packet are stored by the scheduled entity. The processor and the memory are further configured to transmit, to the scheduled entity, a second data packet. The processor and the memory are further configured to receive, from the scheduled entity, a second HARQ response comprising a reset NACK of the second data packet. The reset NACK is configured to indicate that soft-decision decoding values of the second data packet are discarded by the scheduled entity.

Another aspect of the present disclosure provides a scheduled entity for wireless communication. The scheduled entity includes means for receiving, from a scheduling entity, a first data packet. The scheduled entity further includes means for transmitting, to the scheduling entity, a first HARQ response comprising a full negative acknowledgment (NACK) of the first data packet. The scheduled entity further includes means for storing soft-decision decoding values of the first data packet in a HARQ buffer. The scheduled entity further includes means for receiving, from the scheduling entity, a second data packet corresponding to a retransmission of the first data packet. The scheduled entity further includes means for transmitting, to the scheduling entity, a second HARQ response comprising a reset NACK of the second data packet, without storing soft-decision decoding values of the second data packet.

Another aspect of the present disclosure provides a scheduling entity for wireless communication. The scheduling entity includes means for transmitting, to a scheduled entity, a first data packet. The scheduling entity further includes means for receiving, from the scheduled entity, a first HARQ response comprising a full negative acknowledgment (NACK) of the first data packet. The full NACK is configured to indicate that soft-decision decoding values of the first data packet are stored by the scheduled entity. The scheduling entity further includes means for transmitting, to the scheduled entity, a second data packet. The scheduling entity further includes means for receiving, from the scheduled entity, a second HARQ response comprising a reset NACK of the second data packet. The reset NACK is configured to indicate that soft-decision decoding values of the second data packet are discarded by the scheduled entity.

Another aspect of the present disclosure provides a non-transitory computer-readable medium storing computer-executable code. The computer-readable medium comprises code for causing a scheduled entity to receive, from a scheduling entity, a first data packet. The computer-readable medium further comprises code for causing the scheduled entity to transmit, to the scheduling entity, a first HARQ response comprising a full negative acknowledgment (NACK) of the first data packet. The computer-readable medium further comprises code for causing the scheduled entity to store soft-decision decoding values of the first data packet in a HARQ buffer. The computer-readable medium further comprises code for causing the scheduled entity to receive, from the scheduling entity, a second data packet. The computer-readable medium further comprises code for causing the scheduled entity to transmit, to the scheduling entity, a second HARQ response comprising a reset NACK of the second data packet, without storing soft-decision decoding values of the second data packet.

Another aspect of the present disclosure provides a non-transitory computer-readable medium storing computer-executable code. The computer-readable medium comprises code for causing a scheduling entity to transmit, to a scheduled entity, a first data packet. The computer-readable medium further comprises code for causing the scheduling entity to receive, from the scheduled entity, a first HARQ response comprising a full negative acknowledgment (NACK) of the first data packet. The full NACK is configured to indicate that soft-decision decoding values of the first data packet are stored by the scheduled entity. The computer-readable medium further comprises code for causing the scheduling entity to transmit, to the scheduled entity, a second data packet. The computer-readable medium further comprises code for causing the scheduling entity to receive, from the scheduled entity, a second HARQ response comprising a reset NACK of the second data packet. The reset NACK is configured to indicate that soft-decision decoding values of the second data packet are discarded by the scheduled entity.

Another aspect of the present disclosure provides a method of wireless communication using a hybrid automatic repeat request (HARQ) process. A scheduled entity receives, from a scheduling entity, a first data packet. The scheduled entity transmits, to the scheduling entity, a first HARQ response comprising a full negative acknowledgment (NACK) of the first data packet. The scheduled entity stores log likelihood ratios (LLRs) of the first data packet in a HARQ buffer. The scheduled entity receives, from the scheduling entity, a second data packet. The scheduled entity transmits, to the scheduling entity, a second HARQ response comprising a reset NACK of the second data packet, without storing LLRs of the second data packet.

Another aspect of the present disclosure provides a method of wireless communication using a HARQ process. A scheduling entity transmits, to a scheduled entity, a first data packet. The scheduling entity receives, from the scheduled entity, a first HARQ response comprising a full negative acknowledgment (NACK) of the first data packet. The full NACK indicates that log likelihood ratios (LLRs) of the first data packet are stored by the scheduled entity. The scheduling entity transmits, to the scheduled entity, a second data packet. The scheduling entity receives, from the scheduled entity, a second HARQ response comprising a reset NACK of the second data packet. The reset NACK indicates that LLRs of the second data packet are discarded by the scheduled entity.

Another aspect of the present disclosure provides a scheduled entity for wireless communication. The scheduled entity includes a communication interface configured to communicate with a scheduling entity using a HARQ process, a memory, and a processor operatively coupled to the communication interface and the memory. The processor and the memory are configured to receive, from the scheduling entity, a first data packet. The processor and the memory are further configured to transmit, to the scheduling entity, a first HARQ response comprising a full negative acknowledgment (NACK) of the first data packet. The processor and the memory are further configured to store log likelihood ratios (LLRs) of the first data packet in a HARQ buffer. The processor and the memory are further configured to receive, from the scheduling entity, a second data packet. The processor and the memory are further configured to transmit, to the scheduling entity, a second HARQ response comprising a reset NACK of the second data packet, without storing LLRs of the second data packet.

Another aspect of the present disclosure provides a scheduling entity for wireless communication. The scheduling entity includes a communication interface configured to communicate with a scheduled entity using a HARQ process, a memory, and a processor operatively coupled to the communication interface and the memory. The processor and the memory are configured to transmit, to the scheduled entity, a first data packet. The processor and the memory are further configured to receive, from the scheduled entity, a first HARQ response comprising a full negative acknowledgment (NACK) of the first data packet. The full NACK is configured to indicate that log likelihood ratios (LLRs) of the first data packet are stored by the scheduled entity. The processor and the memory are further configured to transmit, to the scheduled entity, a second data packet. The processor and the memory are further configured to receive, from the scheduled entity, a second HARQ response comprising a reset NACK of the second data packet. The reset NACK is configured to indicate that LLRs of the second data packet are discarded by the scheduled entity.

Another aspect of the present disclosure provides a scheduled entity for wireless communication. The scheduled entity includes means for receiving, from a scheduling entity, a first data packet. The scheduled entity further includes means for transmitting, to the scheduling entity, a first HARQ response comprising a full negative acknowledgment (NACK) of the first data packet. The scheduled entity further includes means for storing log likelihood ratios (LLRs) of the first data packet in a HARQ buffer. The scheduled entity further includes means for receiving, from the scheduling entity, a second data packet corresponding to a retransmission of the first data packet. The scheduled entity further includes means for transmitting, to the scheduling entity, a second HARQ response comprising a reset NACK of the second data packet, without storing LLRs of the second data packet.

Another aspect of the present disclosure provides a scheduling entity for wireless communication. The scheduling entity includes means for transmitting, to a scheduled entity, a first data packet. The scheduling entity further includes means for receiving, from the scheduled entity, a first HARQ response comprising a full negative acknowledgment (NACK) of the first data packet. The full NACK is configured to indicate that log likelihood ratios (LLRs) of the first data packet are stored by the scheduled entity. The scheduling entity further includes means for transmitting, to the scheduled entity, a second data packet. The scheduling entity further includes means for receiving, from the scheduled entity, a second HARQ response comprising a reset NACK of the second data packet. The reset NACK is configured to indicate that LLRs of the second data packet are discarded by the scheduled entity.

Another aspect of the present disclosure provides a non-transitory computer-readable medium storing computer-executable code. The computer-readable medium comprises code for causing a scheduled entity to receive, from a scheduling entity, a first data packet. The computer-readable medium further comprises code for causing the scheduled entity to transmit, to the scheduling entity, a first HARQ response comprising a full negative acknowledgment (NACK) of the first data packet. The computer-readable medium further comprises code for causing the scheduled entity to store log likelihood ratios (LLRs) of the first data packet in a HARQ buffer. The computer-readable medium further comprises code for causing the scheduled entity to receive, from the scheduling entity, a second data packet. The computer-readable medium further comprises code for causing the scheduled entity to transmit, to the scheduling entity, a second HARQ response comprising a reset NACK of the second data packet, without storing LLRs of the second data packet.

Another aspect of the present disclosure provides a non-transitory computer-readable medium storing computer-executable code. The computer-readable medium comprises code for causing a scheduling entity to transmit, to a scheduled entity, a first data packet. The computer-readable medium further comprises code for causing the scheduling entity to receive, from the scheduled entity, a first HARQ response comprising a full negative acknowledgment (NACK) of the first data packet. The full NACK is configured to indicate that log likelihood ratios (LLRs) of the first data packet are stored by the scheduled entity. The computer-readable medium further comprises code for causing the scheduling entity to transmit, to the scheduled entity, a second data packet. The computer-readable medium further comprises code for causing the scheduling entity to receive, from the scheduled entity, a second HARQ response comprising a reset NACK of the second data packet. The reset NACK is configured to indicate that LLRs of the second data packet are discarded by the scheduled entity.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In a similar fashion, while exemplary embodiments may be discussed below as device, system, or method embodiments it should be understood that such exemplary embodiments can be implemented in various devices, systems, and methods.

DETAILED DESCRIPTION

Figure 1:
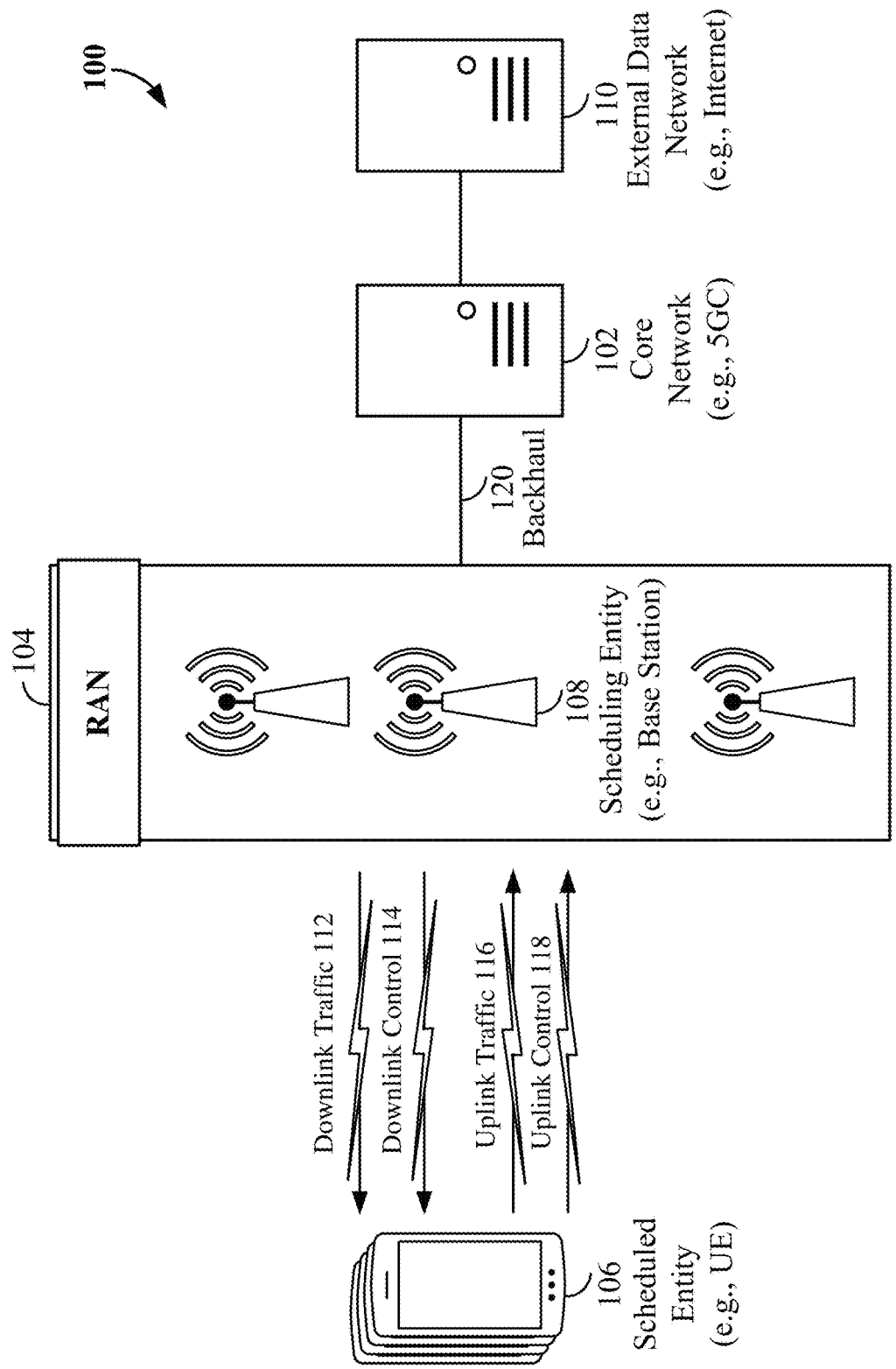
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily include a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The electromagnetic spectrum is often subdivided, based on frequency/wavelength, into various classes, bands, channels, etc. In 5G New Radio (NR) two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.126 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2× (52.6 GHz-71 GHz), FR4 (71 GHz-114.25 GHz), and FR5 (114.25 GHz-275 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR2×, FR4, and/or FR5, or may be within the EHF band.

Aspects of the present disclosure relate to apparatuses, systems, and methods of wireless communication that use an adaptive hybrid automatic repeat request (HARQ) procedure and a multi-threaded HARQ procedure for improving HARQ buffer utilization and management. In some aspects of the disclosure, a user equipment (UE) may transmit different types of negative acknowledgment (NACK): for example, a full NACK and a reset NACK in an adaptive HARQ procedure. The reset NACK allows the UE to reduce HARQ buffers needed for supporting concurrent HARQ processes. In some aspects of the disclosure, the base station may transmit different redundancy data in a HARQ retransmission dependent on what types of NACK the UE transmitted. In some aspects of the disclosure, the base station may communicate with the UE using multiple light HARQ processes or threads that use less HARQ buffers than a typical HARQ procedure.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; vehicles, aircraft, ships, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
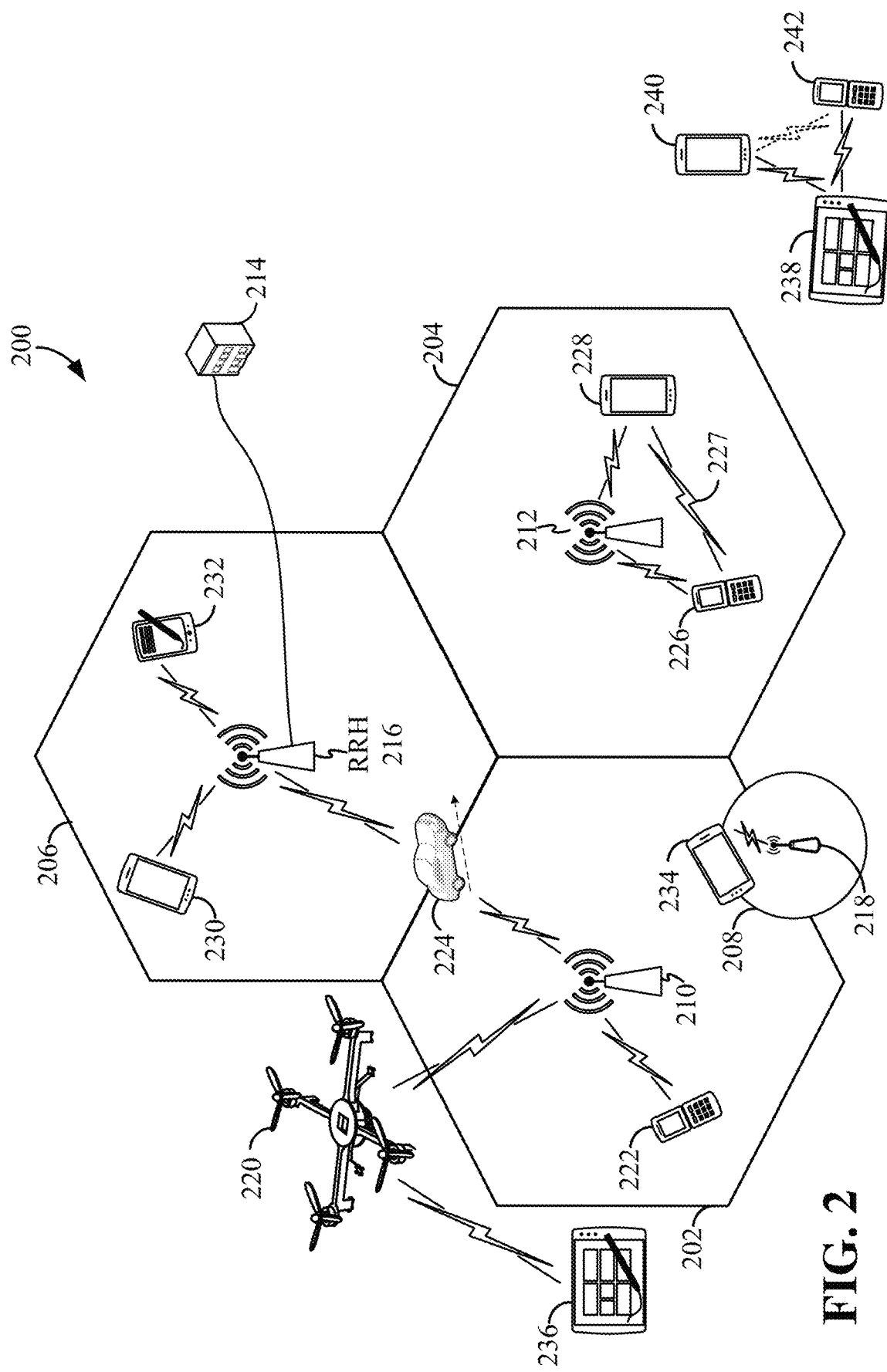
FIG. 2 is a schematic illustration of an exemplary radio access network according to some aspects.

FIG. 2 is a schematic illustration of an exemplary radio access network (RAN) according to some aspects of the present disclosure. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220. In some examples, a mobile network node (e.g., quadcopter 220) may be configured to function as a UE. For example, the quadcopter 220 may operate within a cell 202 by communicating with the base station 210 of the cell.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some aspects, the UEs can communicate with their corresponding base stations using a HARQ procedure that supports full NACK and reset NACK. In some examples, the UEs 222, 224, 226, 228, 230, 232, 234, 236, 238, 240, and/or 242 may be the same as the UE/scheduled entity 106 described above and illustrated in FIG. 1.

In a further aspect of the RAN 200, sidelink signals may be used between UEs without necessarily relying on scheduling or control information from a base station. For example, two or more UEs (e.g., UEs 226 and 228) may communicate with each other using peer-to-peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different subbands of the carrier bandwidth. This type of full-duplex communication may be referred to herein as sub-band full duplex (SBFD), also known as flexible duplex.

Figure 3:
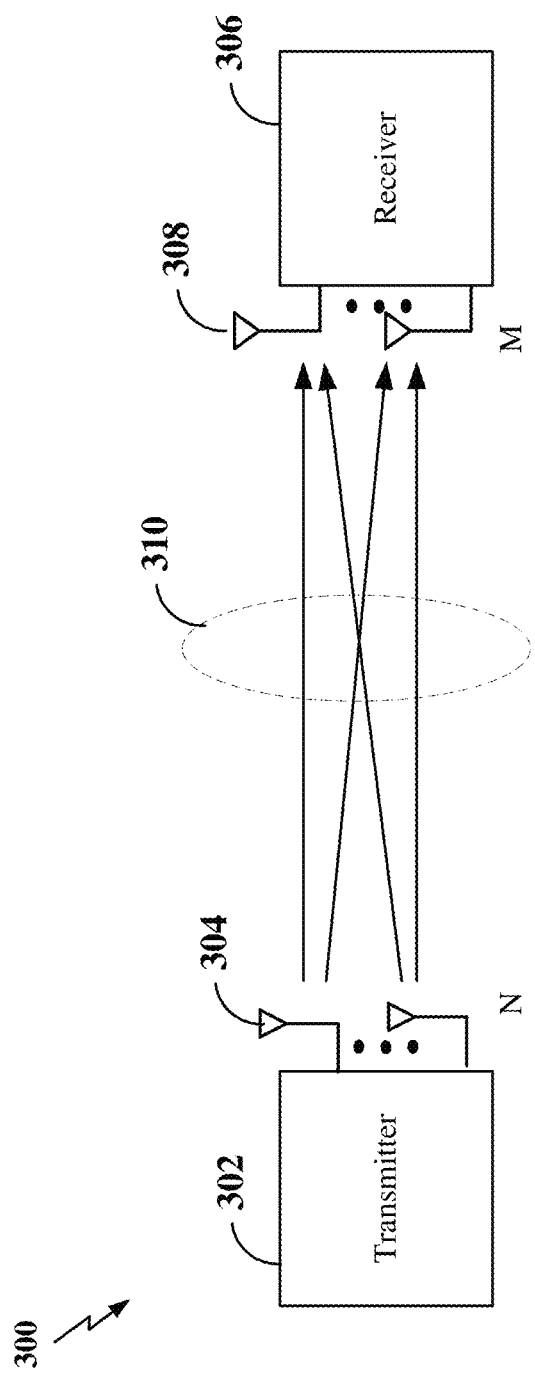
FIG. 3 is a block diagram illustrating a wireless communication system supporting multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas), and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-plus-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the channel-state information reference signals (CSI-RS) with separate C-RS sequences for each layer to provide for multi-layer channel estimation. From the CSI-RS, the UE may measure the channel quality across layers and resource blocks and feed back the RI and a channel quality indicator (CQI) that indicates to the base station a modulation and coding scheme (MCS) to use for transmissions to the UE for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In some 5G NR networks, user data may be coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching. Aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms as well as other waveforms.

Within the present disclosure, a radio frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each subframe 402 (e.g., a 1 ms subframe) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
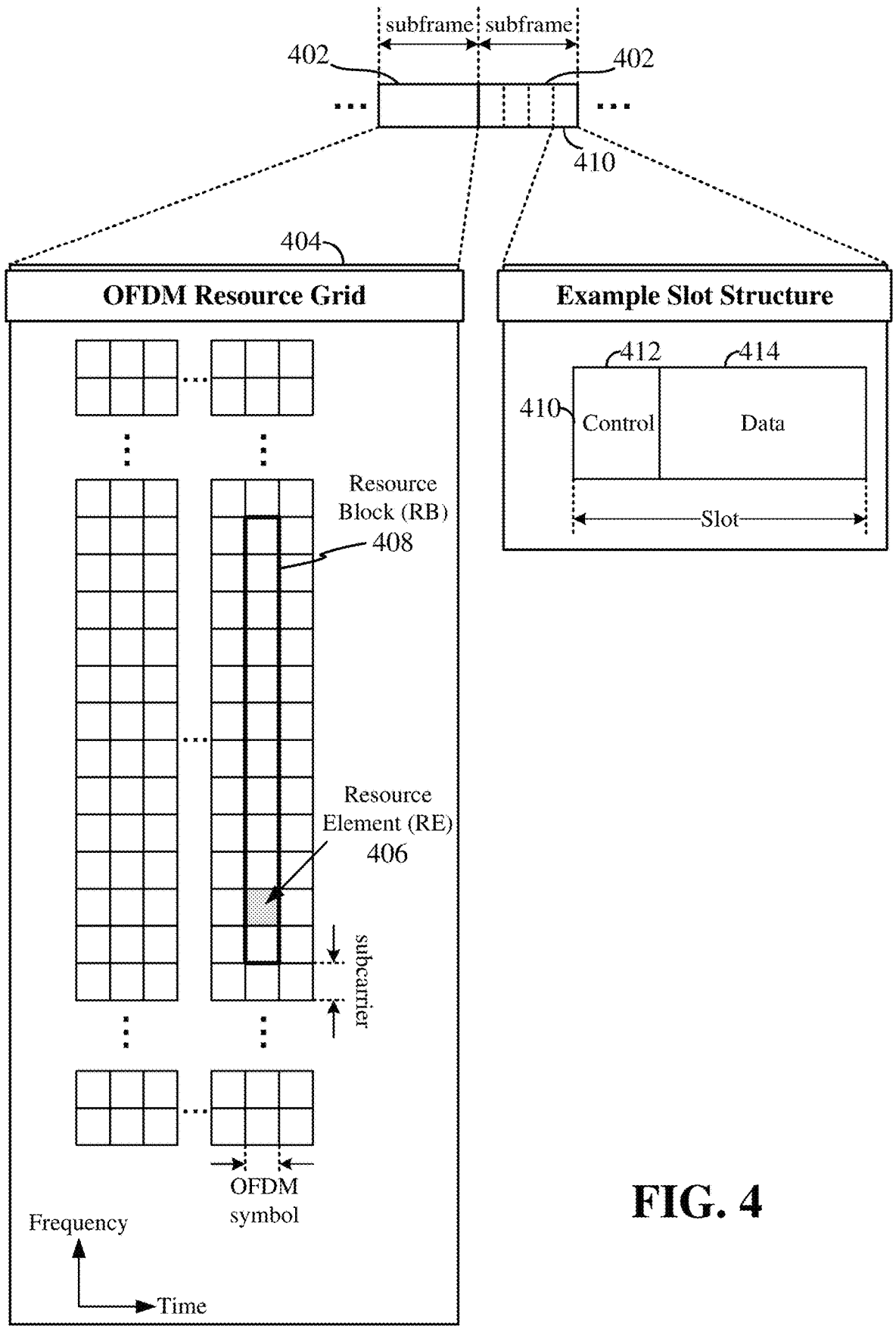
FIG. 4 is a schematic illustration of an organization of wireless resources in an air interface utilizing orthogonal frequency divisional multiplexing (OFDM) according to some aspects.

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a scheduled entity 106) may utilize one or more REs 406 to carry UL control information 118 (UCI). The UCI can originate from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc. HARQ techniques may be used for UL and/or DL transmission.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support an SCS ranging from 15 kHz to 480 kHz or higher.

Figure 5:
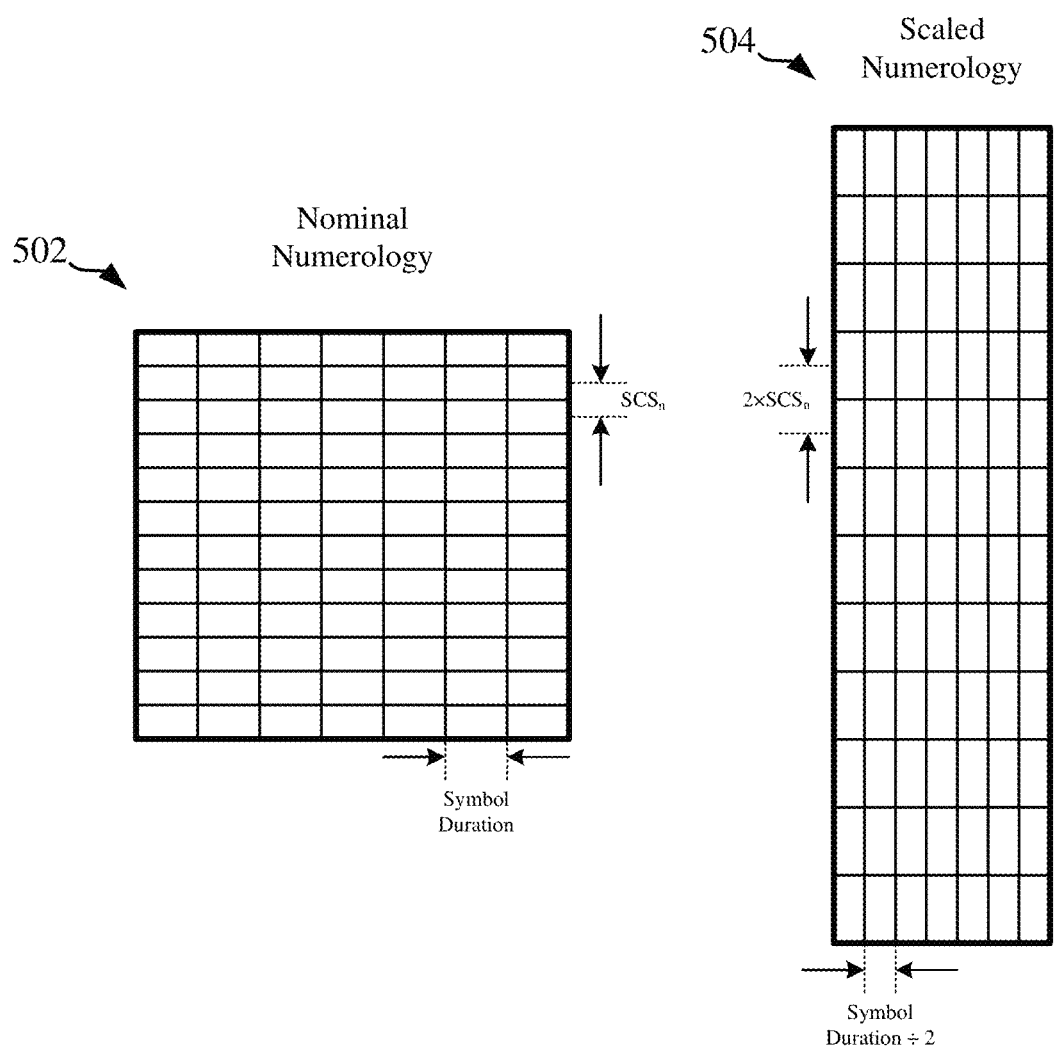
FIG. 5 is a schematic illustration of an OFDM air interface utilizing a scalable numerology according to some aspects.

To illustrate this concept of a scalable numerology, FIG. 5 shows a first RB 502 having a nominal numerology, and a second RB 504 having a scaled numerology. As one example, the first RB 502 may have a 'nominal' subcarrier spacing ($SCS_n$) of 30 kHz, and a 'nominal' symbol duration$_n$ of 333 μs. Here, in the second RB 504, the scaled numerology includes a scaled SCS of double the nominal SCS, or $2 \times SCS_n = 60$ kHz. Because this provides twice the bandwidth per symbol, it results in a shortened symbol duration to carry the same information. Thus, in the second RB 504, the scaled numerology includes a scaled symbol duration of half the nominal symbol duration, or (symbol duration$_n$)÷2=167 μs.

Figure 6:
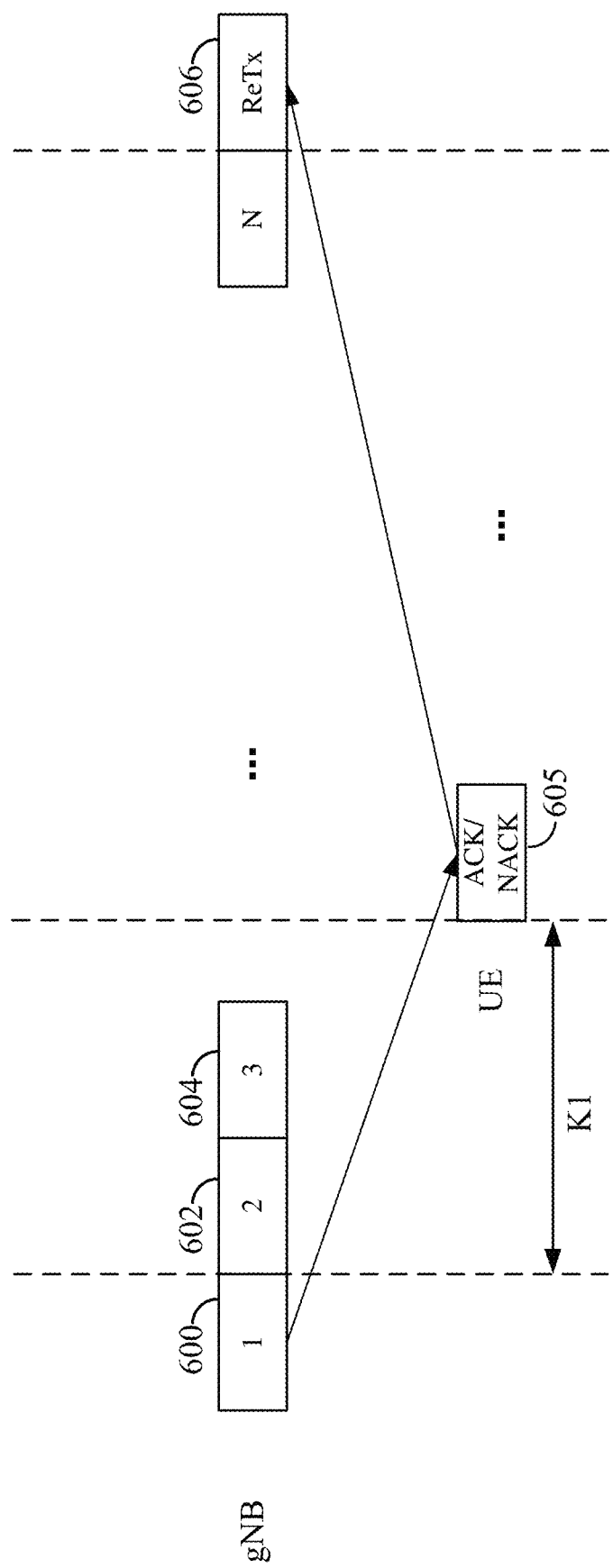
FIG. 6 is a diagram illustrating an exemplary hybrid automatic repeat request (HARQ) procedure according to some aspects.

FIG. 6 is a diagram illustrating an exemplary HARQ procedure in accordance with some aspects of the present disclosure. In the HARQ procedure, a network entity (e.g., a base station or gNB) may use multiple concurrent HARQ processes to communicate with a scheduled entity (e.g., UE). Two HARQ processes are concurrent when the HARQ processes partially or completely overlap in time. For example, a gNB may use up to a maximum of N concurrent HARQ processes to communicate with a UE (N is a positive integer). In one example, the UE may support up to sixteen (N=16) concurrent HARQ processes per cell in an NR network.

The UE receives the transmitted signal from the scheduling entity and processes the received signal to obtain received symbols. The UE then computes the log-likelihood ratios (LLRs) for the code bits based on the received symbols. The LLRs are indicative of the likelihood of a zero ('0') or one ('1') being sent for each code bit. For a given code bit, a positive LLR value may indicate more confidence in '0' being sent for the code bit, a negative LLR value may indicate more confidence in '1' being sent for the code bit, and an LLR value of zero may indicate equal likelihood of '0' or '1' being sent for the code bit. In other aspects, soft-decision decoding values may be any values that can indicate the probability or likelihood of a data bit being '0' or '1' in this disclosure. In this manner, soft decisions associated with a HARQ process can indicate a confidence level associated with the HARQ process (e.g., confidence as to whether the received signal/symbols lack communication errors).

In a first HARQ process, the gNB may transmit first DL data 600 to the UE. In a second HARQ process, the gNB may transmit second DL data 602 to the UE. In a third HARQ process, the gNB may transmit third DL data 604 to the UE. The UE may transmit a HARQ response or feedback (e.g., ACK or NACK) for each HARQ process. For example, when the UE fails to receive the first DL data 600 of the first HARQ process, the UE can transmit a NACK 605 within a predetermined HARQ processing time (e.g., time period K1 illustrated in FIG. 6). In response to the NACK 605, the gNB retransmits the data in a HARQ retransmission (ReTx) 606. In general, the longer the processing time, the more concurrent HARQ processes may be needed to continue to schedule data for the UE. Therefore, the UE needs to have more memory (e.g., HARQ buffers) for supporting more concurrent HARQ processes. Two HARQ processes are concurrent when one HARQ process can start before the other HARQ process is ended or completed (e.g., receiving an ACK/NACK).

There are two main types or categories of HARQ algorithms: chase-combining HARQ (HARQ-CC) and incremental redundancy HARQ (HARQ-IR). In HARQ-CC, a HARQ retransmission (e.g., ReTx 606) is identical to the original transmission (e.g., first DL data 600). The information may then ideally be obtained error-free by virtue of a process called soft combining, where the redundant bits from the retransmission and the original transmission may be combined before decoding to increase the probability of correct reception of each bit.

On the other hand, in HARQ-IR, the retransmitted code block may be different from the originally transmitted code block, and further, if multiple retransmissions are made, each retransmission may differ from one another. Here, retransmissions may include different sets of bits: for example, corresponding to different code rates or algorithms; corresponding to different portions of the original information block, some of which may not have been transmitted in the original transmission; corresponding to forward error correction (FEC) bits that were not transmitted in the original transmission; or other suitable schemes. As with HARQ-CC, here, the information may be obtained error-free by utilizing soft combining to combine the retransmitted bits with the originally transmitted bits.

Each HARQ-IR transmission is typically referred to as a redundancy version (RV), with the initial transmission of a packet (e.g., code block) being denoted RV0 (e.g., the initial redundancy version). The first HARQ-IR retransmission of the packet may be referred to as RV1, the second HARQ-IR retransmission of the packet may be referred to as RV2, and so on, up to RVN, corresponding to the maximum (N) number of retransmissions allowed before the packet is considered lost. For most coding schemes, with HARQ-IR, the initial redundancy version of a packet (e.g., RV0) is self-decodable, meaning that no other transmissions are necessary for the receiver to be able to decode the packet. This is due to the fact that the initial redundancy version (RV0) typically includes substantially all of the systematic bits of the packet. However, subsequent redundancy versions (RV1 . . . RVN) typically include fewer systematic bits, and therefore, may be considered non-self-decodable. Thus, in some examples, subsequent redundancy version transmissions may need to be combined with the initial redundancy version transmission to be able to decode the packet.

In some examples, when the gNB uses higher bands (e.g., mmWave and higher bands) to communicate with the UE in an NR network, the sub-carrier spacing increases with shorter slot duration. However, the UE's processing speed (e.g., HARQ processing time in terms of symbols) may not be able to catch up with the slot duration tightening due to the use of higher bands. For example, the gNB may communicate with the UE using a frequency range 2 (FR2) or frequency range 4 (FR4) in the NR standards. FR4 has a wider carrier spacing and shortened slots than FR2. In one example, the UE may be able to process the HARQ feedback in 20 symbols when FR2 is used. However, the UE may not be able to process the HARQ feedback within the same number of symbols when FR4 is used because the UE's processing speed or resources may be limited. The result is longer processing time measured in terms of symbols when the UE uses FR4.

The performance benefit of HARQ combining of retransmissions is more significant when the SINR across retransmissions are comparable. However, in an NR network, an interference pattern may be bursty compared to an LTE network or the like. Therefore, HARQ combining may not always produce a significant benefit (e.g., decoding enhancement) when the UE experiences bursty interference. In that case, saving the received data (e.g., buffered data packets represented by the LLRs of the data) for HARQ combining may not be an efficient use of memory (e.g., HARQ buffers) at the receiver.

Adaptive HARQ Feedback

Figure 7:
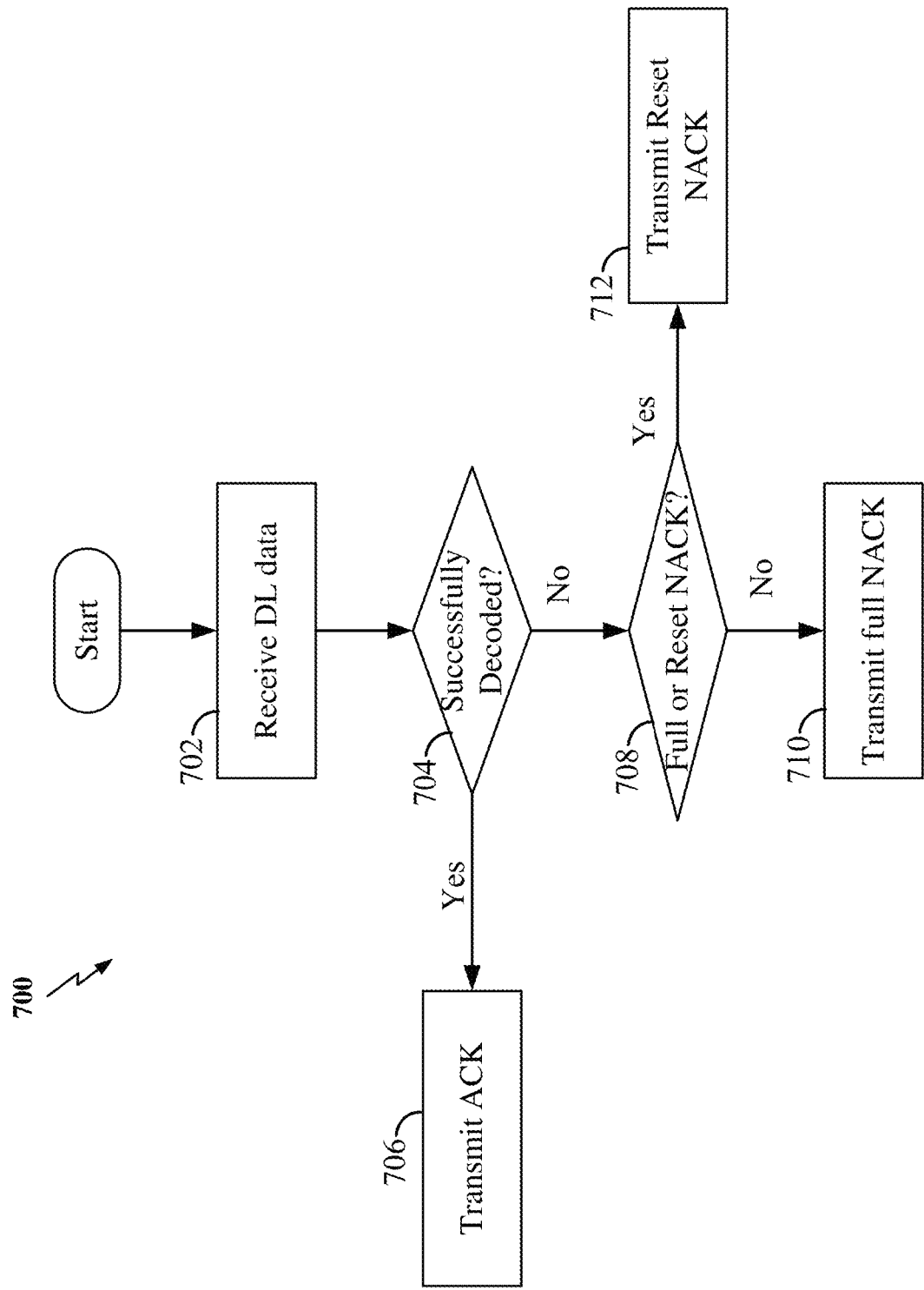
FIG. 7 is a flow chart illustrating a HARQ procedure using adaptive HARQ feedback according to some aspects.

FIG. 7 is a flow chart illustrating a HARQ procedure 700 using adaptive HARQ feedback in accordance with some aspects of the present disclosure. As described below, some or all illustrated features may be omitted in a particular implementation within the scope of the present disclosure, and some illustrated features may not be required for the implementation of all embodiments. In some examples, the process 700 may be carried out by the scheduled entity 1500 illustrated in FIG. 15. In some examples, the process 700 may be carried out by any suitable apparatus or means for carrying out the functions or algorithms described below.

At block 702, a scheduled entity (e.g., UE) receives DL data from a scheduling entity (e.g., gNB). For example, the DL data may be the first DL data 600 of the first HARQ process described in relation to FIG. 6. The scheduled entity may receive the DL data via a downlink data channel, for example, PDSCH. At decision block 704, the scheduled entity 1500 determines whether or not the DL data is successfully decoded. The scheduled entity may utilize any suitable integrity checking mechanism, such as a checksum or a cyclic redundancy check (CRC) to determine if the data is decoded correctly. In some examples, the scheduled entity may perform decoding on the received data by combining all previously received data packets (HARQ initial transmission and/or retransmission(s)), if any exists. The scheduled entity may combine currently received data with previously received and stored data (e.g., LLRs) from a previous transmission that is not successfully decoded. Combining the LLRs may increase the chance or potential of successfully decoding the data. If the scheduled entity successfully decoded the received data, the procedure proceeds to block 706; otherwise, the procedure proceeds to block 708.

At block 706, if the scheduled entity successfully decoded the DL data, the scheduled entity transmits an ACK to indicate that the DL data was successfully decoded. For example, the scheduled entity may transmit the ACK in a UL channel, for example, PUCCH or PUSCH. At decision block 708, if the scheduled entity failed to successfully decode the DL data, the scheduled entity determines whether to transmit a full NACK or a reset NACK. The scheduled entity may determine the potential decoding enhancement of combining the LLRs of the data. If the scheduled entity determines that combining LLRs is not likely to enhance the decoding success of the DL data, the scheduled entity may decide to transmit a reset NACK. Otherwise, if the scheduled entity determines that combining LLRs may enhance the decoding success of the data, the scheduled entity may decide to transmit a full NACK.

At block 710, the scheduled entity transmits a full NACK and keeps the LLRs in a HARQ buffer for possible combining with the LLRs of subsequent HARQ retransmission(s). At block 712, the scheduled entity transmits a reset NACK and flushes or empties the corresponding HARQ buffer that stores any LLRs of the DL data. When the reset NACK is used, the scheduled entity records the HARQ response status information (e.g., ACK/NACK) but discards any stored LLRs of the DL data. The reset NACK may also be interchangeably called a light NACK in this disclosure. In one example, the scheduled entity may store the reset NACK status using a bit (e.g., NACK status bit) in the HARQ buffer or any memory available at the scheduled entity. By using the reset NACK, the scheduled entity may reduce the amount of HARQ buffers needed for supporting concurrent HARQ processes.

UE Capability to Support Adaptive HARQ

In some aspects of the disclosure, the scheduled entity (e.g., UE) can use a full HARQ buffer for storing a full NACK and a light HARQ buffer for storing a reset NACK. In one aspect, the scheduled entity may transmit UE capability information or a capability message in a radio resource control (RRC) message to indicate the capability to support K full HARQ buffers and N-K light HARQ buffers (K and N are positive integers, where N is larger than K). In one example, the scheduled entity may transmit K full NACKs and N-K reset NACKs in N active concurrent HARQ processes while using only K full HARQ buffers. In this case, the scheduled entity can use a fewer number of full HARQ buffers than the number of concurrent HARQ processes. The scheduled entity stores the LLRs of the received data in the full HARQ buffers for K full HARQ processes, and stores only the ACK/NACK status of the received data in the light HARQ buffers for N-K light HARQ processes. The light HARQ buffers may be implemented as a single memory or multiple memory units. Each bit in the light HARQ buffers can indicate the ACK/NACK status of the corresponding DL data in a HARQ process. In the light HARQ process, the UE does not store the LLRs of the received data for which the UE transmitted a reset NACK. In one example, the UE may discard the LLRs of the data packet for which a reset NACK was sent. In another example, the UE may discard the LLRs of the HARQ process (e.g., LLRs of the initial transmissions and retransmissions) for which a reset NACK was sent for a data packet.

Full NACK and Reset NACK Selection Factors

In some aspects of the disclosure, a scheduled entity (e.g., UE) may determine to transmit a full NACK or reset NACK (light NACK) in a HARQ process based on one or more factors. Non-limiting examples of the factors include the amount of available memory buffers (e.g., HARQ buffers), an interference pattern (e.g., bursty), an SINR of a channel carrying the received data, and stored HARQ LLRs. In one example, the scheduled entity can transmit a reset NACK when the number of available HARQ buffers is less than a predetermined threshold. In one example, the scheduled entity can transmit a reset NACK when the interference pattern of a channel (e.g., PDSCH) for receiving data in a HARQ process is greater than a predetermined level. When the UE determines to transmit the reset NACK based on the above described exemplary factors, the UE may not store the soft-decision decoding values (e.g., LLRs) at the UE. In some aspects, the UE may discard the current LLRs and/or previously stored LLRs of the same HARQ process.

Figure 8:
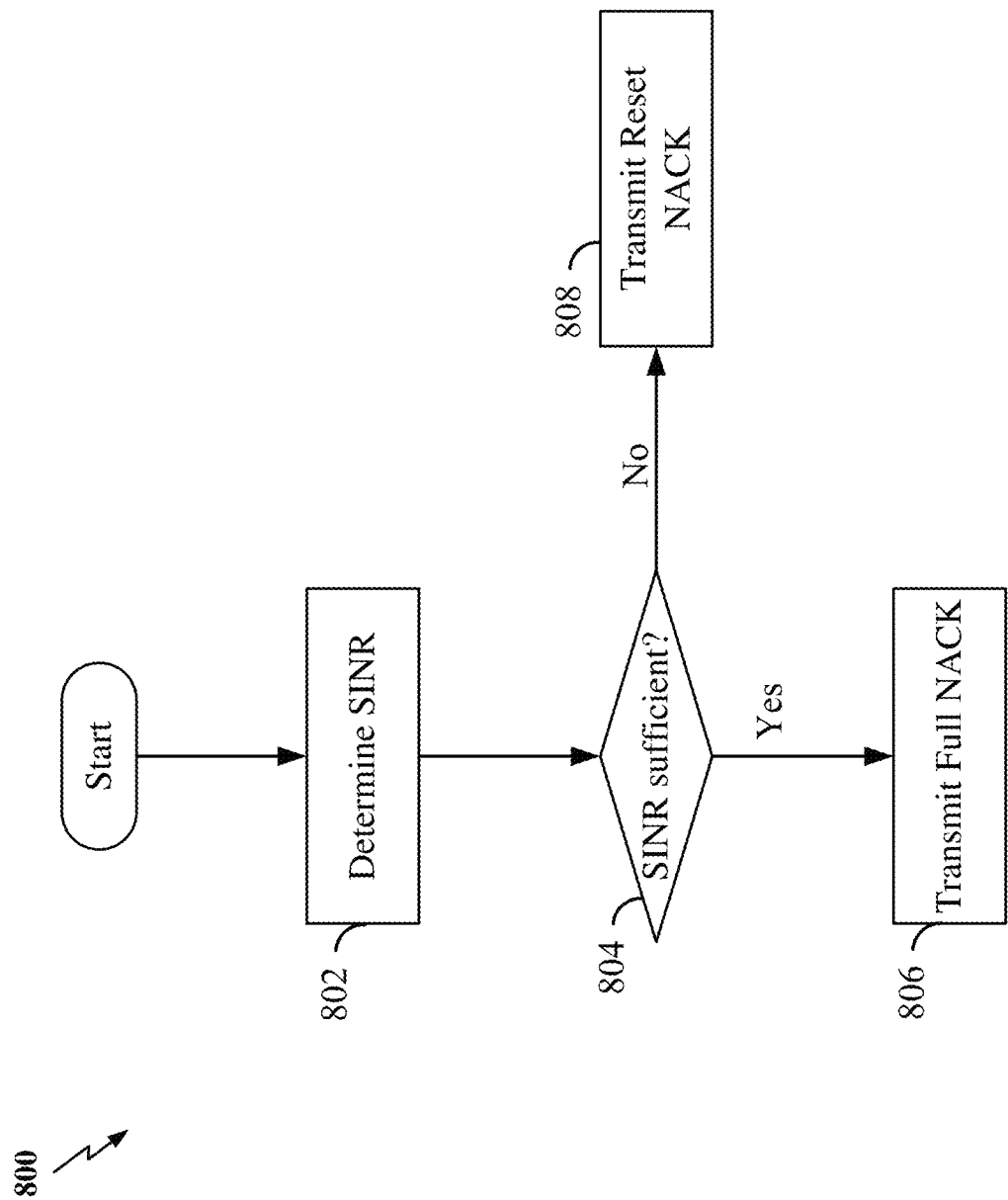
FIG. 8 is a flow chart illustrating an exemplary HARQ acknowledgment process according to some aspects.

FIG. 8 is a flow chart illustrating an exemplary HARQ acknowledgment process 800 in accordance with some aspects of the present disclosure. As described below, some or all illustrated features may be omitted in a particular implementation within the scope of the present disclosure, and some illustrated features may not be required for the implementation of all embodiments. In some examples, the process 800 may be carried out by the scheduled entity 1500 illustrated in FIG. 15. In some examples, the process 800 may be carried out by any suitable apparatus or means for carrying out the functions or algorithms described below.

A scheduled entity (e.g., UE) can receive DL data from a scheduling entity (e.g., gNB) in a HARQ process via a channel (e.g., PDSCH). At block 802, the scheduled entity can determine the SINR of the channel used for receiving the DL data. For example, the data may be any of the DL data of a HARQ process described in relation to FIG. 6. The SINR is a ratio of the desired signal and the unwanted noise. In general, a greater SINR indicates a better chance of successfully decoding the received data by the receiver. In some examples, the scheduled entity may determine the SINR based on the reference signal received quality (RSRQ) of a channel (e.g., PDSCH) carrying the received data.

At decision block 804, the scheduled entity determines whether the SINR of the channel carrying the received data is sufficient. For example, the scheduled entity may compare the current SINR to a long term observed SINR value (e.g., a historic SINR value) of the same beam associated with the channel. The scheduled entity may determine the long term or historic SINR value by tracking and storing the SINR values of a beam used in wireless communication over time. If the current SINR is similar to or greater than the long term or historic SINR value, the scheduled entity may consider that the current SINR is sufficient; otherwise, the scheduled entity may consider the current SINR to be insufficient. In one example, the current SINR is sufficient when it is greater than the long term SINR value.

At block 806, if the current SINR is sufficient, the scheduled entity transmits a full NACK and keeps the corresponding LLRs of the DL data in the HARQ buffers. At block 808, if the current SINR is not sufficient (e.g., substantially less than the long term SINR value), the scheduled entity transmits a reset NACK and flushes the corresponding HARQ buffers (i.e., not keeping the LLRs of the DL data). The scheduled entity can reduce the memory used for HARQ processes by not keeping the LLRs in the HARQ buffers when HARQ combining is not likely to be useful for decoding the data. SINR is used only as an illustrative example in FIG. 8 for selecting the full NACK or reset NACK in an HARQ process. In some embodiments, the scheduled entity may consider other suitable channel quality measurements (e.g., signal quality or signal strength) to determine whether a full NACK or reset NACK will be transmitted.

Figure 9:
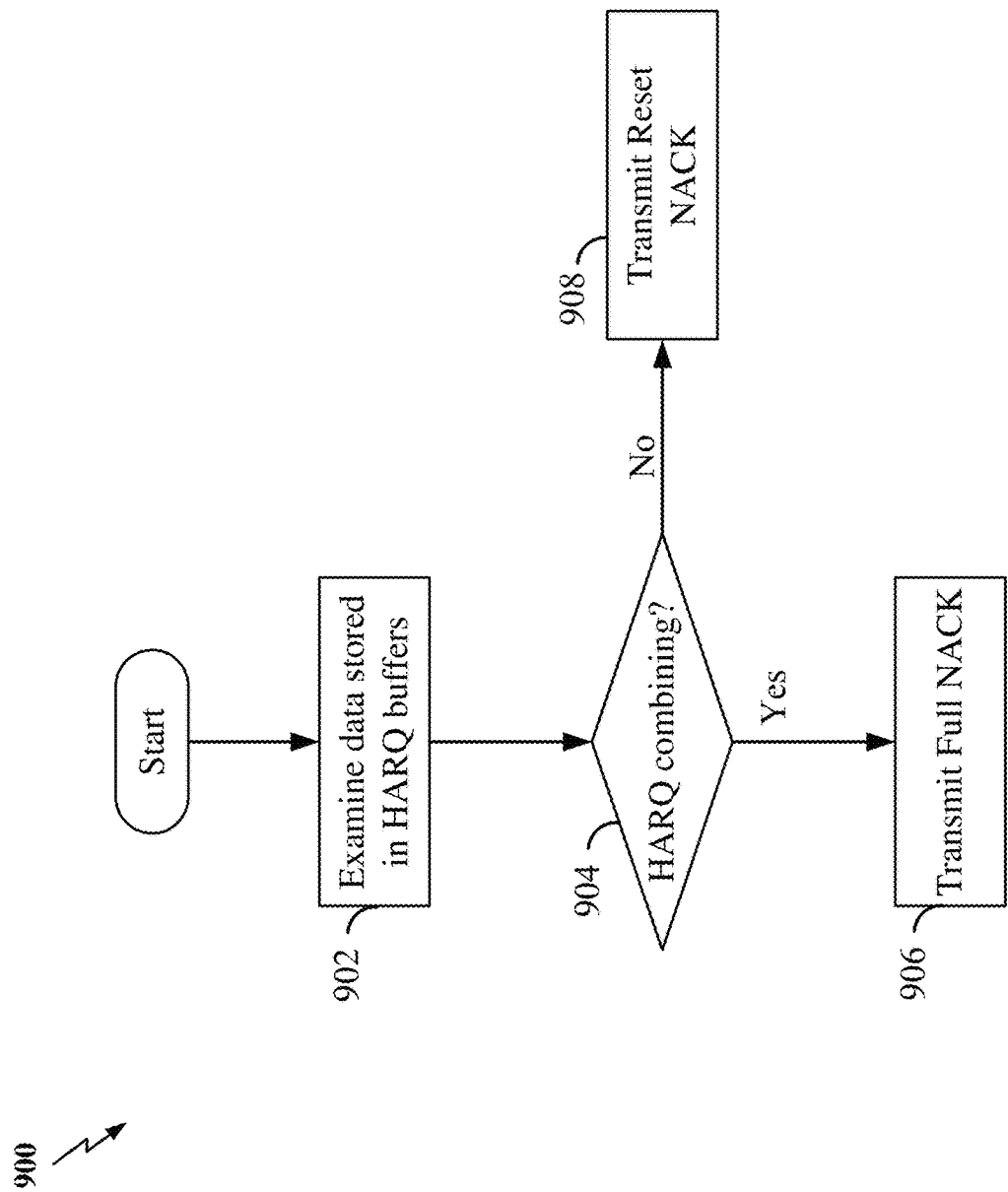
FIG. 9 is a flow chart illustrating another exemplary HARQ acknowledgment process according to some aspects.

FIG. 9 is a flow chart illustrating another exemplary HARQ acknowledgment process 900 in accordance with some aspects of the present disclosure. As described below, some or all illustrated features may be omitted in a particular implementation within the scope of the present disclosure, and some illustrated features may not be required for the implementation of all embodiments. In some examples, the process 900 may be carried out by the scheduled entity 1500 illustrated in FIG. 15. In some examples, the process 900 may be carried out by any suitable apparatus or means for carrying out the functions or algorithms described below.

A scheduled entity (e.g., UE) can receive DL data from a scheduling entity (e.g., gNB) in a HARQ process via a channel (e.g., PDSCH). At block 902, a scheduled entity examines the data stored in the HARQ buffers for HARQ combining purposes. For example, the scheduled entity may determine the SINR values corresponding to initially received data and retransmitted data stored in the HARQ buffers for the HARQ process.

At decision block 904, based on the data stored in the HARQ buffers, the scheduled entity may determine whether or not the current HARQ process will benefit significantly from HARQ combining with the previously received data. For example, if the initially received data and retransmitted data have similar or comparable signal quality (similar SINR values), HARQ combining is more likely to enhance the decoding success of the data. However, if initially received data and retransmitted data have very different signal quality (e.g., SINR values), HARQ combining is not likely to increase the chance of successfully decoding the data. In that case, the scheduled entity may flush the HARQ buffers and discard the data (e.g., LLRs) stored in the buffers. For example, the scheduled entity may determine that HARQ combining is not beneficial when a difference between SINR values is greater than a predetermined threshold.

At block 906, the scheduled entity transmits a full NACK in connection with the determination that HARQ combining is likely to be beneficial based on examining the data in the HARQ buffers. At block 908, the scheduled entity transmits a reset NACK in connection with the determination that HARQ combining is not likely to be beneficial based on examining the data in the HARQ buffers.

Figure 10:
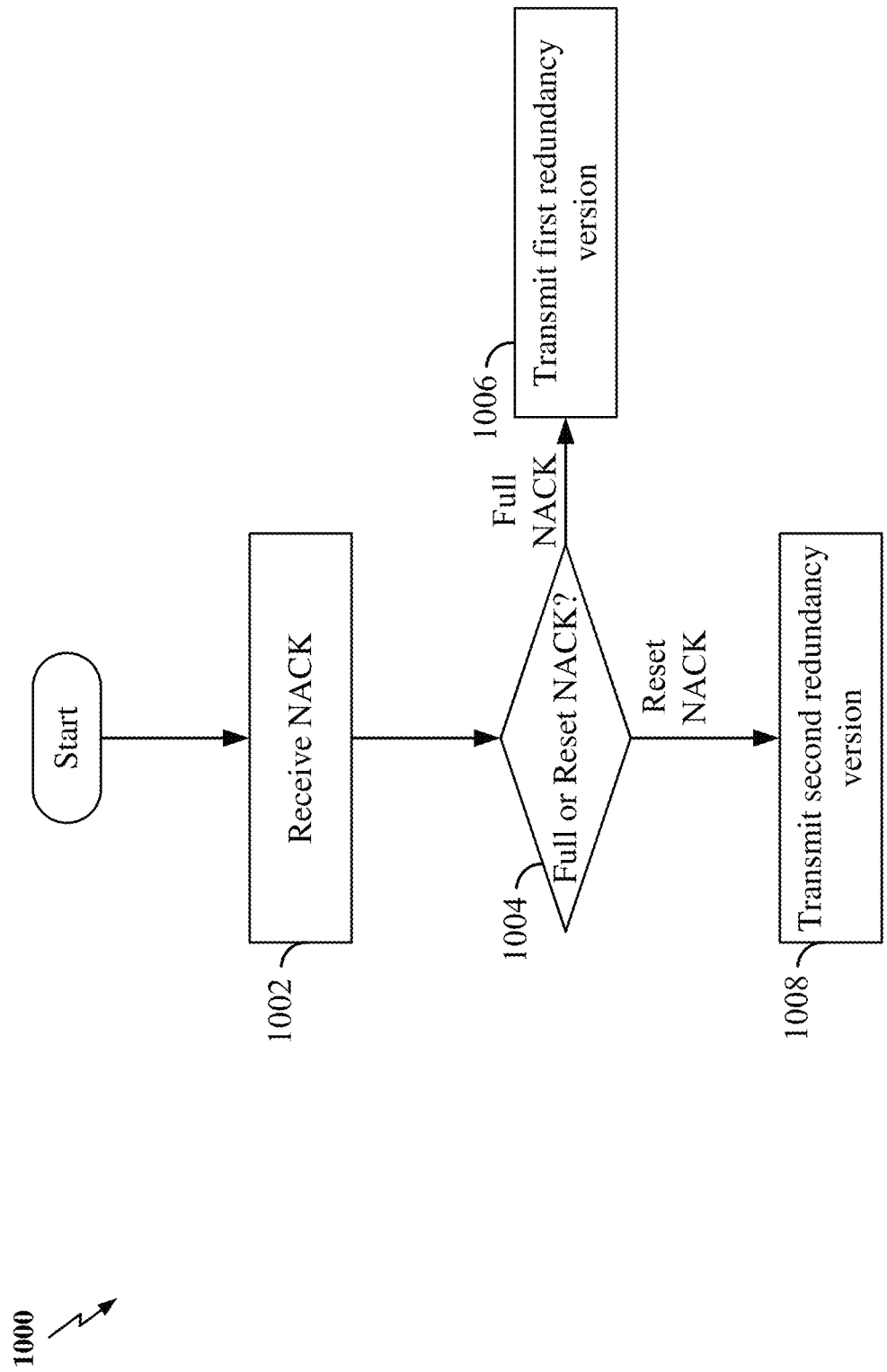
FIG. 10 is a flow chart illustrating an exemplary HARQ procedure according to some aspects.

FIG. 10 is a flow chart illustrating an exemplary HARQ procedure 1000 in accordance with some aspects of the present disclosure. As described below, some or all illustrated features may be omitted in a particular implementation within the scope of the present disclosure, and some illustrated features may not be required for the implementation of all embodiments. In some examples, the process 1000 may be carried out by the scheduling entity 1400 illustrated in FIG. 14. In some examples, the process 1000 may be carried out by any suitable apparatus or means for carrying out the functions or algorithms described below.

A scheduling entity (e.g., gNB) can transmit DL data to a scheduled entity (e.g., UE) in a HARQ process via a channel (e.g., PDSCH). At block 1002, the scheduling entity can receive a NACK from the scheduled entity for the HARQ process. For example, the NACK may be the HARQ NACK 605 described in relation to FIG. 6. In some examples, the scheduling entity may receive the NACK in a PUCCH or PUSCH from the scheduled entity. The NACK indicates that the scheduled entity failed to decode the corresponding data transmitted by the scheduling entity.

At block 1004, the scheduling entity determines whether the received NACK is a full NACK or a reset NACK. The scheduling entity may check the uplink control information (UCI) carried in the PUCCH or PUSCH to determine whether the received NACK is a full NACK or reset NACK. The UCI may have a field or flag that indicates the full NACK or reset NACK. A full NACK indicates that the scheduled entity retains the LLRs of the corresponding data. A reset NACK indicates that the scheduled entity does not retain the LLRs.

At block 1006, if the scheduling entity received a full NACK, the scheduling entity can transmit a first redundancy version of the DL data to the scheduled entity in a HARQ retransmission. At block 1008, if the scheduling entity received a reset NACK, the scheduling entity can transmit a second redundancy version of the DL data in a HARQ retransmission, different from the first redundancy version, to the scheduled entity. The first redundancy version and the second redundancy version may carry different systematic bits and/or redundant bits. When the scheduling entity receives a reset NACK, the scheduling entity knows that the scheduled entity discarded the LLRs associated with the data. In that case, the scheduling entity may choose a redundancy version that includes systematic bits (e.g., RV0) so that the retransmission will include the information needed for decoding the data without using HARQ combining. That is the retransmission including the systematic bits is self-decodable.

Figure 11:
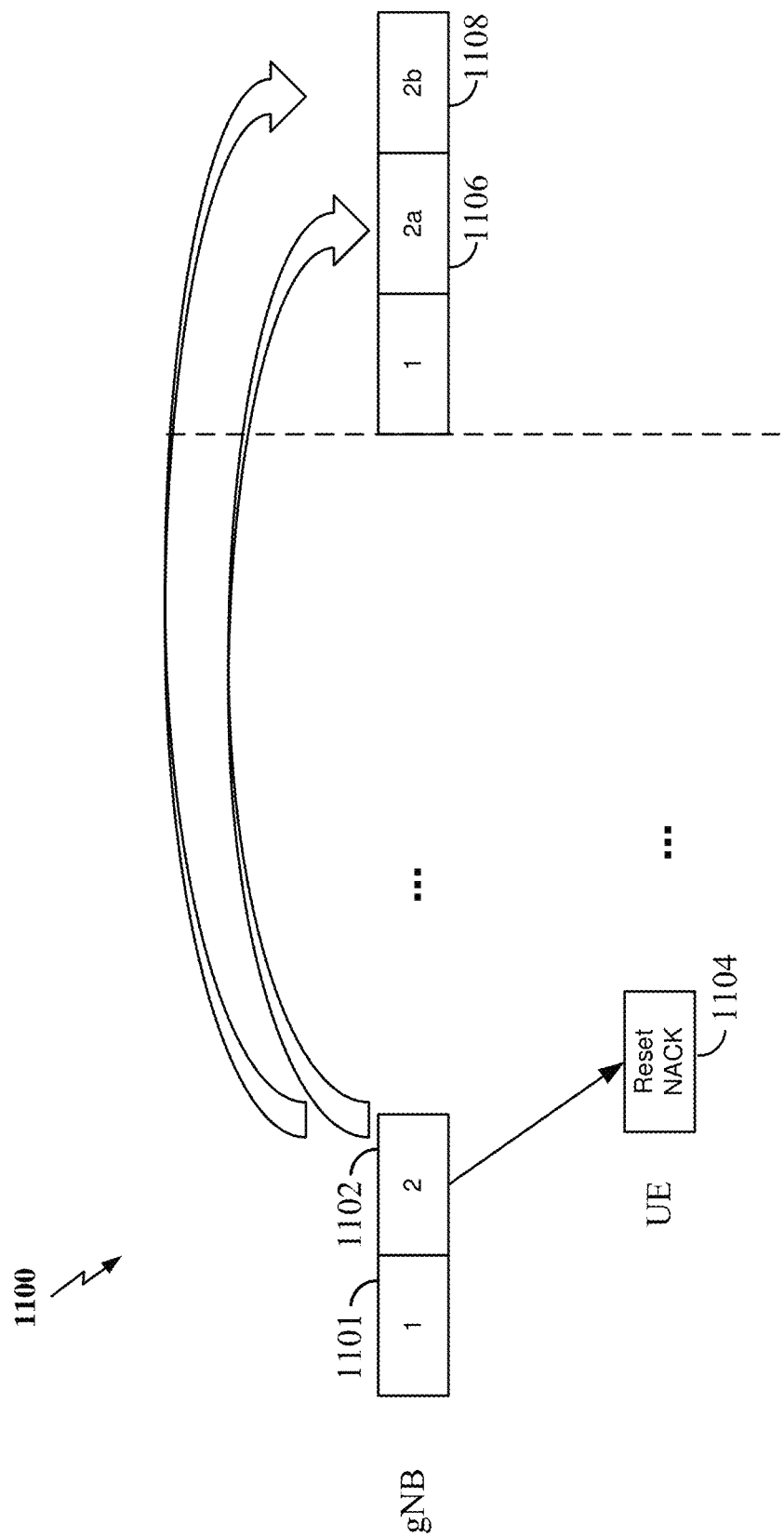
FIG. 11 is a diagram illustrating an exemplary HARQ procedure using multiple threads according to some aspects.

FIG. 11 is a diagram illustrating an exemplary HARQ procedure 1100 using multiple light HARQ threads in accordance with some aspects of the present disclosure. A scheduling entity (e.g., gNB) may communicate with a scheduled entity (e.g., UE) using a HARQ procedure that supports a number of concurrent HARQ processes. For example, the scheduling entity transmits first DL data 1101 in a first HARQ process and second DL data 1102 in a second HARQ process. If the scheduled entity did not successfully decode the DL data 1102 of the second HARQ process, the scheduled entity may transmit a reset NACK 1104 in a UL channel (e.g., PUCCH or PUSCH). As described above, a HARQ process using a reset NACK consumes less memory resources (e.g., HARQ buffers) at the scheduled entity side because the scheduled entity does not retain or store the LLRs of the data that is acknowledged using the reset NACK.

In some aspects of the disclosure, a scheduling entity may communicate with a scheduled entity using a light HARQ process. In some scenarios, a light HARQ process can be configured to support multiple HARQ threads. Light HARQ processes may be used in conjunction with regular HARQ processes (e.g., same time, partially overlapping, serially, parallel, etc.). Light HARQ process may differ from other HARQ processes in one or more manners (e.g., different timing, using reduced memory resources, etc.). HARQ processes may alternate between light and non-light (e.g., normal or typical) based on a variety of factors.

HARQ processes may change types in some examples. As one example and as shown in FIG. 11, the second HARQ process can become a light HARQ process. This change may occur after a scheduling entity receives a reset NACK 1104. Then, the scheduling entity may create multiple HARQ threads in a light HARQ process. Generally, in a HARQ thread, the scheduled entity may provide only ACK/NACK feedback to the scheduling entity without storing corresponding LLRs. For example, the scheduling entity may transmit data to the scheduled entity in a first thread 2a 1106 and a second thread 2b 1108. For each thread, the scheduled entity may transmit an ACK or reset NACK to the scheduling entity. In a light HARQ process, according to some aspects, the scheduled entity only keeps track of the ACK/NACK status of the received data but does not save the corresponding LLRs. Not saving HARQ related information (e.g., corresponding LLRs) may reduce size of needed buffer or memory resources in some scenarios. Therefore, a light HARQ process can use less HARQ buffers or resources, and the scheduled entity can support multiple threads with available HARQ buffers. The scheduling entity may indicate a particular thread by a thread index and associated HARQ process index that may be included in the downlink control information (DCI) carried in a PDCCH.

In some aspects of the disclosure, the scheduling entity may preconfigure one or more HARQ processes to be a light HARQ process. Within a light HARQ process, the scheduling entity may create multiple HARQ threads for which the scheduled entity retains only the ACK/NACK status but not the LLRs of the data from earlier transmissions. Therefore, the light HARQ process can reduce the amount of HARQ buffers needed to support concurrent HARQ processes/threads.

Figure 12:
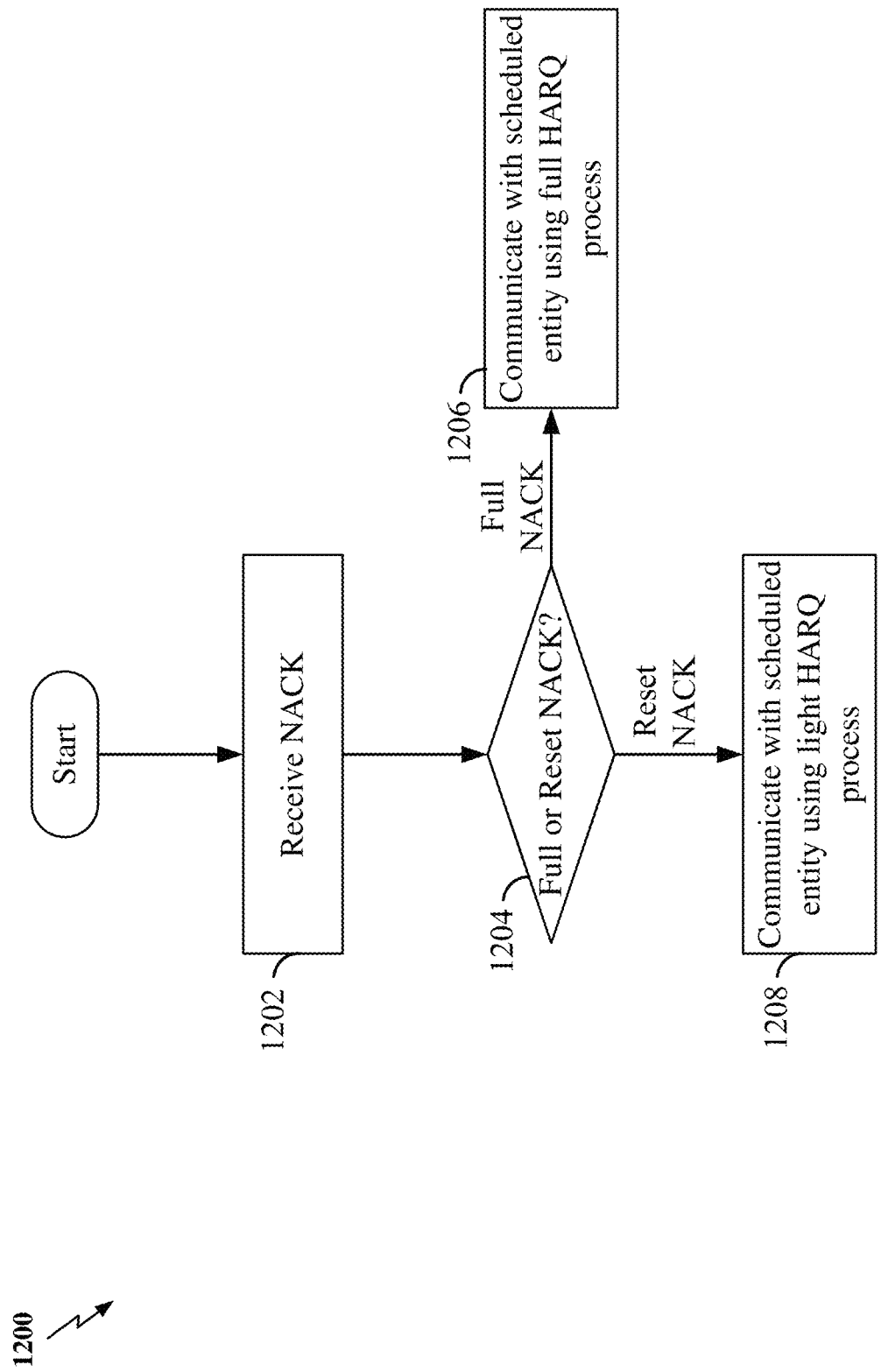
FIG. 12 is a flow chart illustrating an exemplary HARQ procedure according to some aspects.

FIG. 12 is a flow chart illustrating an exemplary HARQ procedure 1200 in accordance with some aspects of the present disclosure. As described below, some or all illustrated features may be omitted in a particular implementation within the scope of the present disclosure, and some illustrated features may not be required for the implementation of all embodiments. In some examples, the process 1200 may be carried out by the scheduling entity 1400 illustrated in FIG. 14. In some examples, the procedure 1200 may be carried out by any suitable apparatus or means for carrying out the functions or algorithms described below.

A scheduling entity (e.g., gNB) can transmit DL data to a scheduled entity (e.g., UE) in a HARQ process via a channel (e.g., PDSCH). At block 1202, the scheduling entity receives a NACK from the scheduled entity in the HARQ process. For example, the scheduling entity may receive the NACK via a PUSCH or PUCCH in the HARQ process. At decision block 1204, the scheduling entity determines whether the received NACK is a full NACK or a reset NACK as described above. The scheduling entity may receive uplink control information (UCI) from the scheduled entity, and the UCI can indicate whether the currently received NACK is a full NACK or reset NACK. For example, the UCI may use different bit values or fields to represent or indicate the full NACK and reset NACK, respectively.

At block 1206, if the scheduling entity received a full NACK, the scheduling entity communicates with the scheduled entity using a full HARQ process. In the full HARQ process, the scheduled entity keeps or retains the LLRs of the received data in its HARQ buffers for later HARQ combining, for example, when the scheduling entity transmits different redundancy versions (e.g., RV0 and RV1).

At block 1208, if the scheduling entity received a reset NACK, the scheduling entity can communicate with the scheduled entity using a light HARQ process that may include one or more threads. The scheduling entity may transmit new data to the scheduled entity in each thread. In the light HARQ process, the scheduled entity stores the ACK/NACK status of the received data, but not the LLRs of data. Therefore, more concurrent HARQ processes (e.g., threads of a light HARQ process) may be supported when the scheduling entity communicates with the scheduled entity using the light HARQ process.

Figure 13:
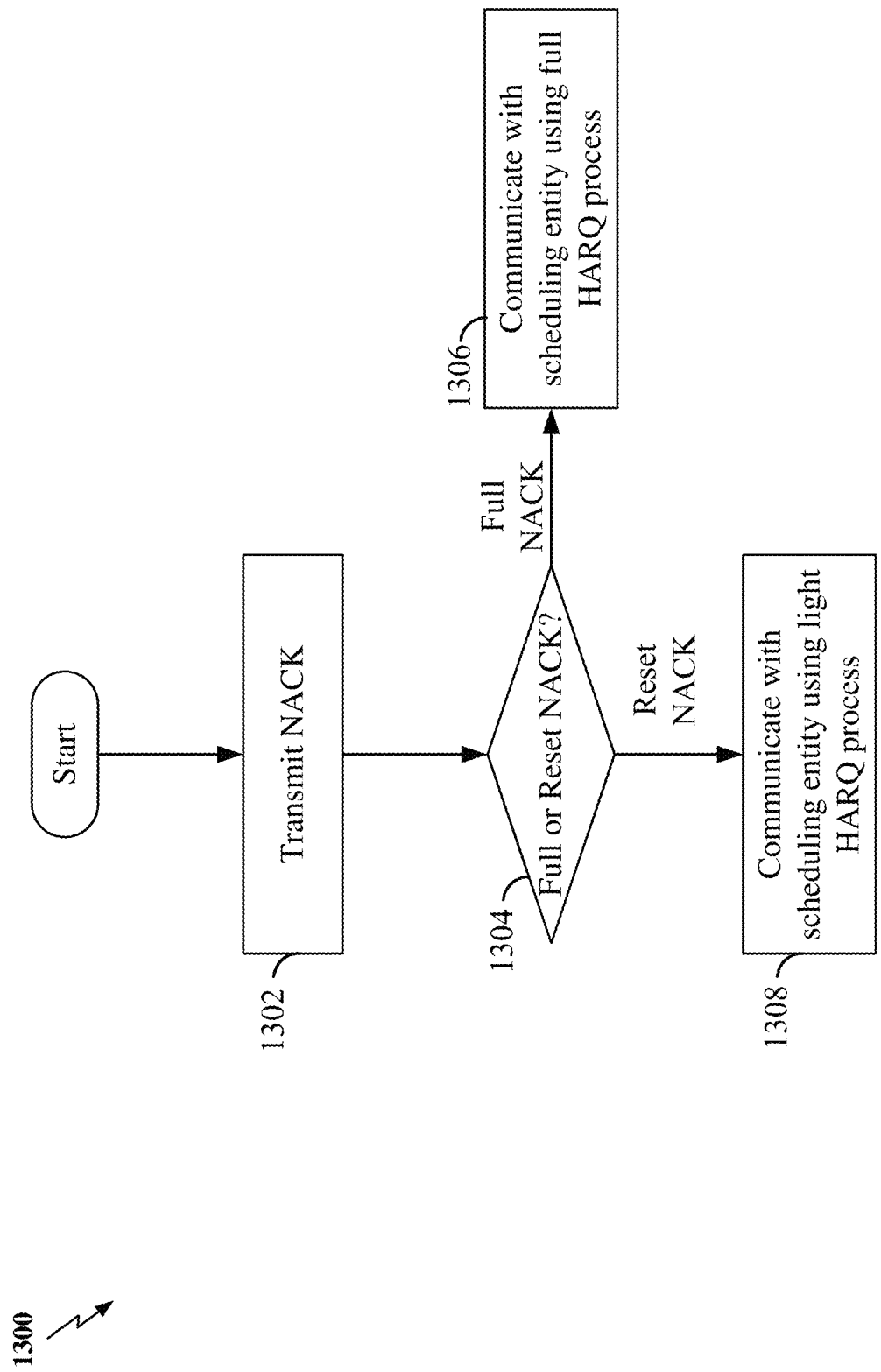
FIG. 13 is a flow chart illustrating an exemplary HARQ procedure according to some aspects.

FIG. 13 is a flow chart illustrating an exemplary HARQ procedure 1300 in accordance with some aspects of the present disclosure. As described below, some or all illustrated features may be omitted in a particular implementation within the scope of the present disclosure, and some illustrated features may not be required for the implementation of all embodiments. In some examples, the procedure 1300 may be carried out by the scheduled entity 1500 illustrated in FIG. 15. In some examples, the procedure 1300 may be carried out by any suitable apparatus or means for carrying out the functions or algorithms described below.

A scheduled entity (e.g., UE) can receive DL data from a scheduling entity (e.g., gNB) in a HARQ process via a channel (e.g., PDSCH). At block 1302, the scheduled entity can transmit a NACK (full NACK or reset NACK) to the scheduling entity in the HARQ process. The scheduled entity may transmit uplink control information (UCI) in a PUCCH or PUSCH to indicate that the transmitted NACK is a full NACK or reset NACK. The UCI may use different bit values or fields to represent or indicate the full NACK and reset NACK, respectively.

At decision block 1304, if the scheduled entity transmitted a full NACK, the procedure proceeds to block 1306; otherwise, if the scheduled entity transmitted a reset NACK, the procedure proceeds to block 1308.

At block 1306, the scheduled entity communicates with the scheduling entity using a full HARQ process. In the full HARQ process, the scheduled entity keeps or retains the LLRs of the received data in its HARQ buffers for possible HARQ combining. At block 1308, the scheduled entity communicates with the scheduling entity using a light HARQ process that may include one or more threads. The scheduled entity may receive new data from the scheduling entity in each thread. In the light HARQ process, the scheduled entity stores the ACK/NACK status of the received data, but not the LLRs of data. That is, the scheduled entity can discard the LLRs of the data acknowledged by, for example, the reset NACK.

Figure 14:
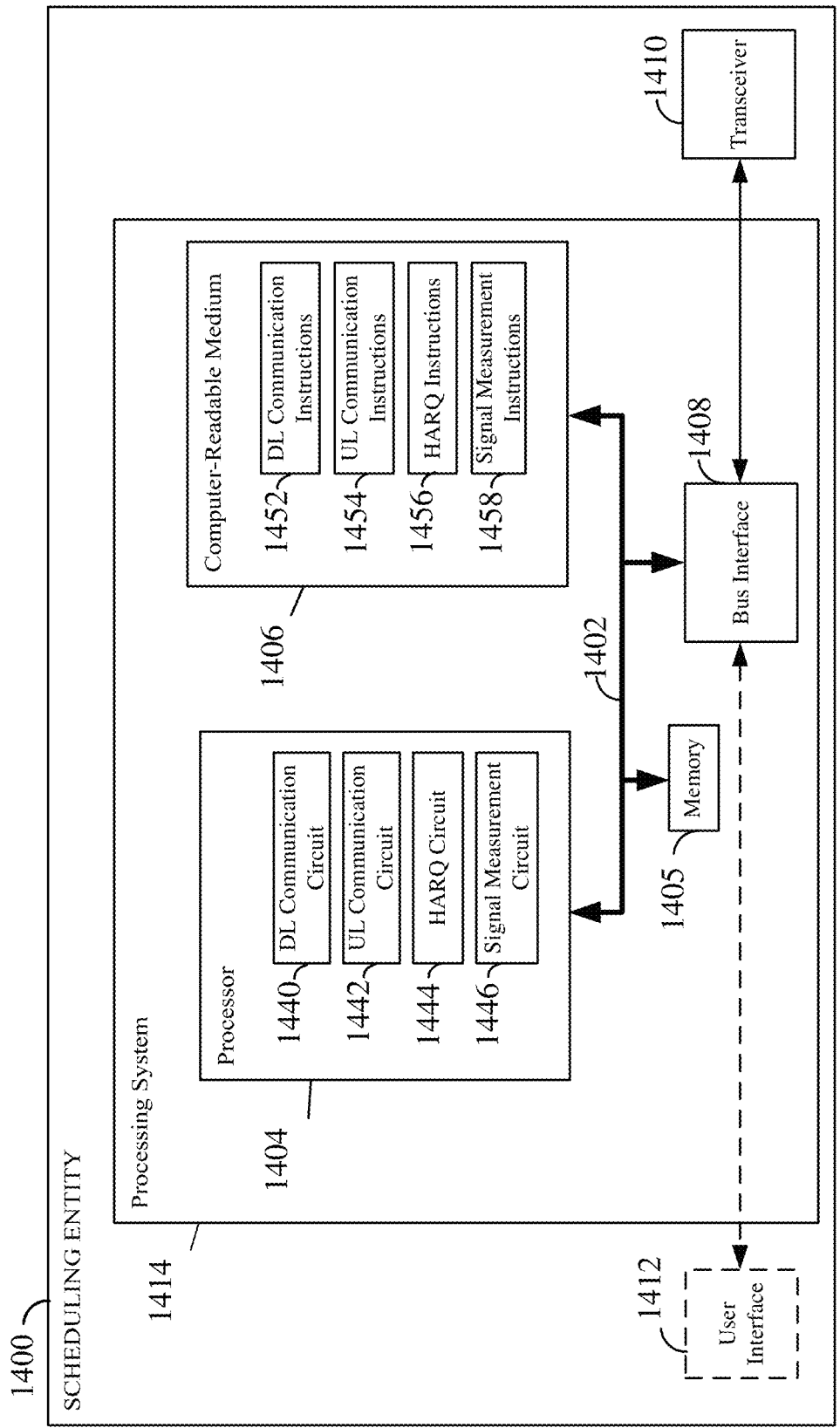
FIG. 14 is a block diagram illustrating an example of a hardware implementation for a scheduling entity according to some aspects.

FIG. 14 is a block diagram illustrating an example of a hardware implementation for a scheduling entity 1400 employing a processing system 1414. For example, the scheduling entity 1400 may be a base station (e.g., gNB) as illustrated in any one or more of FIGS. 1 and/or 2.

The scheduling entity 1400 may be implemented with a processing system 1414 that includes one or more processors 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1400 may be configured to perform any one or more of the functions and processes described herein. That is, the processor 1404, as utilized in a scheduling entity 1400, may be used to implement any one or more of the processes and procedures described and illustrated in FIGS. 6-13, 16, and 17.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 communicatively couples together various circuits including one or more processors (represented generally by the processor 1404), a memory 1405, and computer-readable media (represented generally by the computer-readable medium 1406). The bus 1402 may also link various other circuits such as timing sources, peripherals, voltage regulators, and power management circuits, which are well known in the art, and therefore, will not be described any further. A bus interface 1408 provides an interface between the bus 1402 and a transceiver 1410. The transceiver 1410 provides a communication interface or means for communicating with various other apparatus over a transmission medium. Depending upon the nature of the apparatus, a user interface 1412 (e.g., keypad, display, speaker, microphone, joystick, touch screen) may also be provided. Of course, such a user interface 1412 is optional, and may be omitted in some examples, such as a base station.

In some aspects of the disclosure, the processor 1404 may include circuitry configured for various functions, including, for example, wireless communication using a HARQ process that can support full NACK and reset NACK. For example, the circuitry may be configured to implement one or more of the functions, procedures, and processes described in relation to FIGS. 6-13, 16, and 17.

The processor 1404 may include a downlink (DL) communication circuit 1440 that is configured to perform various functions used in DL communication, for example, with a scheduled entity (e.g., UE). For example, the DL communication circuit 1440 may perform one or more of CRC attachment, channel coding, rate matching, scrambling, modulation, layer mapping, precoding, and OFDM signal mapping to facilitate DL communication.

The processor 1404 may include an uplink (UL) communication circuit 1442 that is configured to perform various functions used in UL communication, for example, with a scheduled entity (e.g., UE). For example, the UL communication circuit 1442 may perform one or more of OFDM signal demapping, MIMO receiver processing, demodulation, descrambling, channel decoding, and CRC check, to facilitate UL communication.

The processor 1404 may include a HARQ circuit 1444 that is configured to perform various HARQ related functions used in wireless communication. For example, the HARQ circuit 1444 may perform HARQ configuration, HARQ response processing, HARQ retransmission, HARQ process management, etc. In one example, a HARQ response may be an ACK, full NACK, or reset NACK.

The processor 1404 may include a signal measurement circuit 1446 that is configured to measure various signal levels and quality. For example, the signal measurement circuit 1446 may measure received signal strength indicator (RSSI), reference signal received power (RSRP), reference signal received quality (RSRQ), and/or signal-to-interference-plus-noise ratio (SINR) of a signal or channel between the scheduling entity and a scheduled entity.

The processor 1404 is responsible for managing the bus 1402 and general processing, including the execution of software stored on the computer-readable medium 1406. The software, when executed by the processor 1404, causes the processing system 1414 to perform the various functions described below for any particular apparatus. The computer-readable medium 1406 and the memory 1405 may also be used for storing data (e.g., HARQ LLRs and data) that is manipulated by the processor 1404 when executing software.

One or more processors 1404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1406. The computer-readable medium 1406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1406 may reside in the processing system 1414, external to the processing system 1414, or distributed across multiple entities including the processing system 1414. The computer-readable medium 1406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1406 may include software configured for various functions, including, for example, wireless communication using HARQ. For example, the software may be configured to implement one or more of the functions, procedures, and processes described in relation to FIGS. 6-13, 16, and 17. The computer-readable storage medium 1406 may include DL communication instructions 1452 for performing various functions used in DL communication, for example, with a scheduled entity (e.g., UE). For example, the DL communication instructions 1452 may cause the processing system 1414 to perform one or more of CRC attachment, channel coding, rate matching, scrambling, modulation, layer mapping, precoding, and OFDM signal mapping to facilitate DL communication. The computer-readable storage medium 1406 may include UL communication instructions 1454 for performing various functions used in UL communication, for example, with a scheduled entity (e.g., UE). For example, the UL communication instructions 1454 may cause the processing system 1414 to perform one or more of OFDM signal demapping, MIMO receiver processing, demodulation, descrambling, channel decoding, and CRC check, to facilitate UL communication. The computer-readable storage medium 1406 may include HARQ instructions 1456 for performing various HARQ related functions. For example, the HARQ instructions 1456 may cause the processing system 1414 to perform HARQ configuration, HARQ response processing, HARQ retransmission, HARQ process management, etc. The computer-readable storage medium 1406 may include signal measurement instructions 1458 for measuring various signal levels and quality. For example, the signal measurement instructions 1458 may cause the processor 1404 to measure received RSSI, RSRP, RSRQ, and/or SINR of a signal or channel between the scheduling entity and a scheduled entity.

Figure 15:
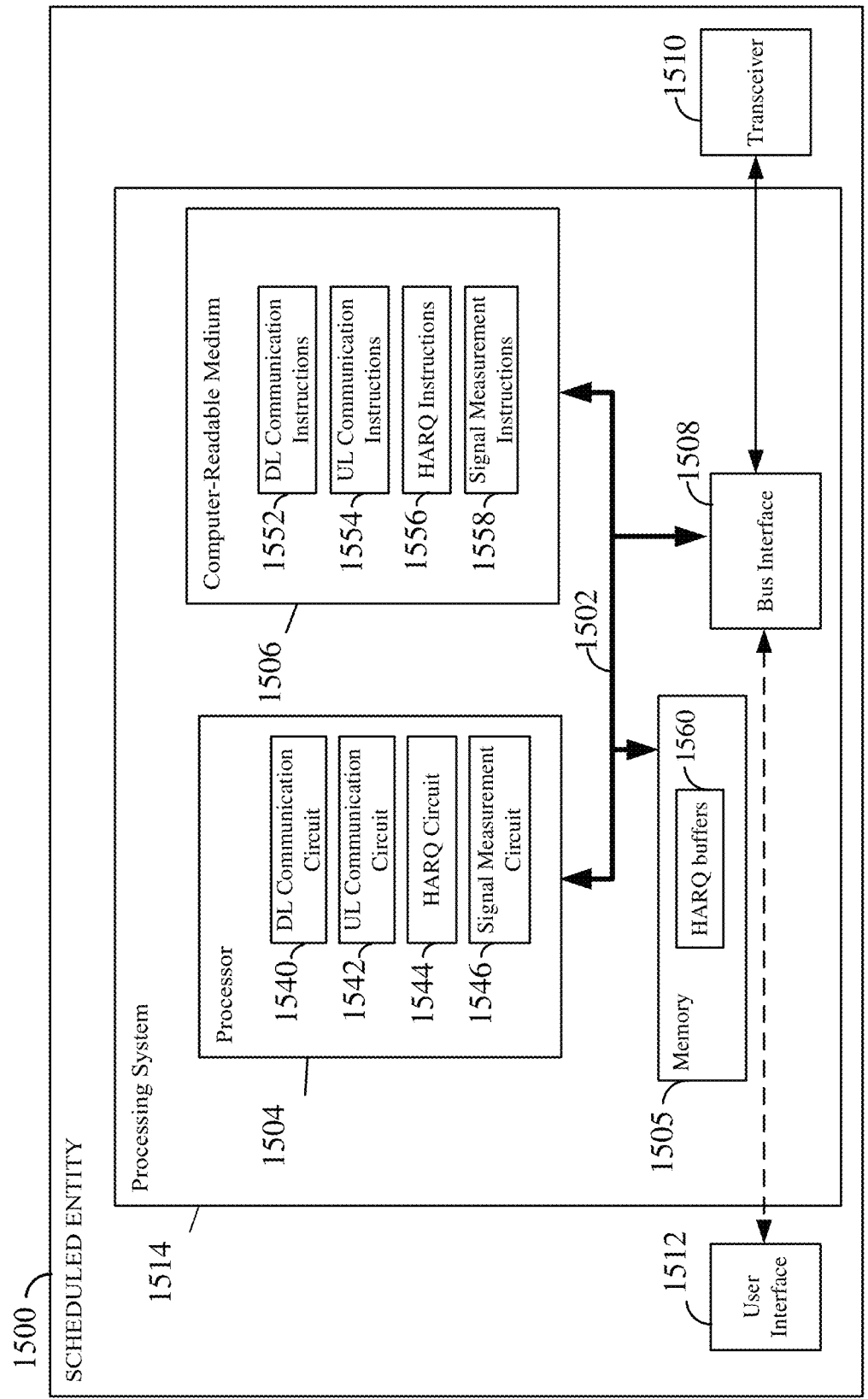
FIG. 15 is a block diagram illustrating an example of a hardware implementation for a scheduled entity according to some aspects.

FIG. 15 is a diagram illustrating an example of a hardware implementation for an exemplary scheduled entity 1500 employing a processing system 1514. In accordance with various aspects of the disclosure, an element, or any portion of an element, or any combination of elements may be implemented with a processing system 1514 that includes one or more processors 1504. For example, the scheduled entity 1500 may be a user equipment (UE) as illustrated in any one or more of FIGS. 1 and/or 2.

The processing system 1514 may be substantially the same as the processing system 1414 illustrated in FIG. 14, including a bus interface 1508, a bus 1502, memory 1505, a processor 1504, and a computer-readable medium 1506. Furthermore, the scheduled entity 1500 may include a user interface 1512 and a transceiver 1510 substantially similar to those described above in FIG. 14. That is, the processor 1504, as utilized in a scheduled entity 1500, may be used to implement any one or more of the processes described and illustrated in FIGS. 6-13, 16, and 17.

In some aspects of the disclosure, the processor 1504 may include circuitry configured for various functions, including, for example, wireless communication using a HARQ process that can support full NACK and reset NACK. For example, the circuitry may be configured to implement one or more of the functions, procedures, and processes described in relation to FIGS. 6-13, 16, and 17.

The processor 1504 may include a DL communication circuit 1540 that is configured to perform various functions used in DL communication, for example, with a scheduling entity (e.g., gNB). For example, the DL communication circuit 1540 may perform one or more of OFDM signal demapping, MIMO receiver processing, demodulation, descrambling, channel decoding, and CRC check, to facilitate DL communication.

The processor 1504 may include an UL communication circuit 1542 that is configured to perform various functions used in UL communication, for example, with a scheduling entity. For example, the UL communication circuit 1542 may perform one or more of CRC attachment, channel coding, rate matching, scrambling, modulation, layer mapping, precoding, and OFDM signal mapping to facilitate UL communication.

The processor 1504 may include a HARQ circuit 1544 that is configured to perform various HARQ related functions. For example, the HARQ circuit may perform HARQ configuration, HARQ response processing, HARQ retransmission, HARQ process management, etc.

The processor 1504 may include a signal measurement circuit 1546 that is configured to measure various signal levels and quality. For example, the signal measurement circuit 1546 may measure the RSSI, RSRP, RSRQ, and SINR of a signal or channel between the scheduling entity and a scheduled entity.

In one or more examples, the computer-readable storage medium 1506 may include software configured for various functions, including, for example, wireless communication using HARQ. For example, the software may be configured to implement one or more of the functions, procedures, and processes described in relation to FIGS. 6-13, 16, and 17.

The computer-readable storage medium 1506 may include DL communication instructions 1552 for performing various functions used in DL communication, for example, with a scheduling entity (e.g., gNB). For example, the DL communication instructions 1552 may cause the processing system 1514 to perform one or more of OFDM signal demapping, MIMO receiver processing, demodulation, descrambling, channel decoding, and CRC check, to facilitate DL communication.

The computer-readable storage medium 1506 may include UL communication instructions 1554 for performing various functions used in UL communication, for example, with a scheduling entity. For example, the UL communication instructions 1554 may cause the processing system 1514 to perform one or more of CRC attachment, channel coding, rate matching, scrambling, modulation, layer mapping, precoding, and OFDM signal mapping to facilitate UL communication.

The computer-readable storage medium 1506 may include HARQ instructions 1556 for performing various HARQ related functions. For example, the HARQ instructions 1556 may cause the processing system 1514 to perform HARQ configuration, HARQ response processing, HARQ retransmission, HARQ process management, etc.

The computer-readable storage medium 1506 may include signal measurement instructions 1558 for measuring various signal levels and quality. For example, the signal measurement instructions 1558 may cause the processing system 1514 to measure the RSSI, RSRP, RSRQ, and SINR of a signal or channel between the scheduling entity and a scheduled entity.

Figure 16:
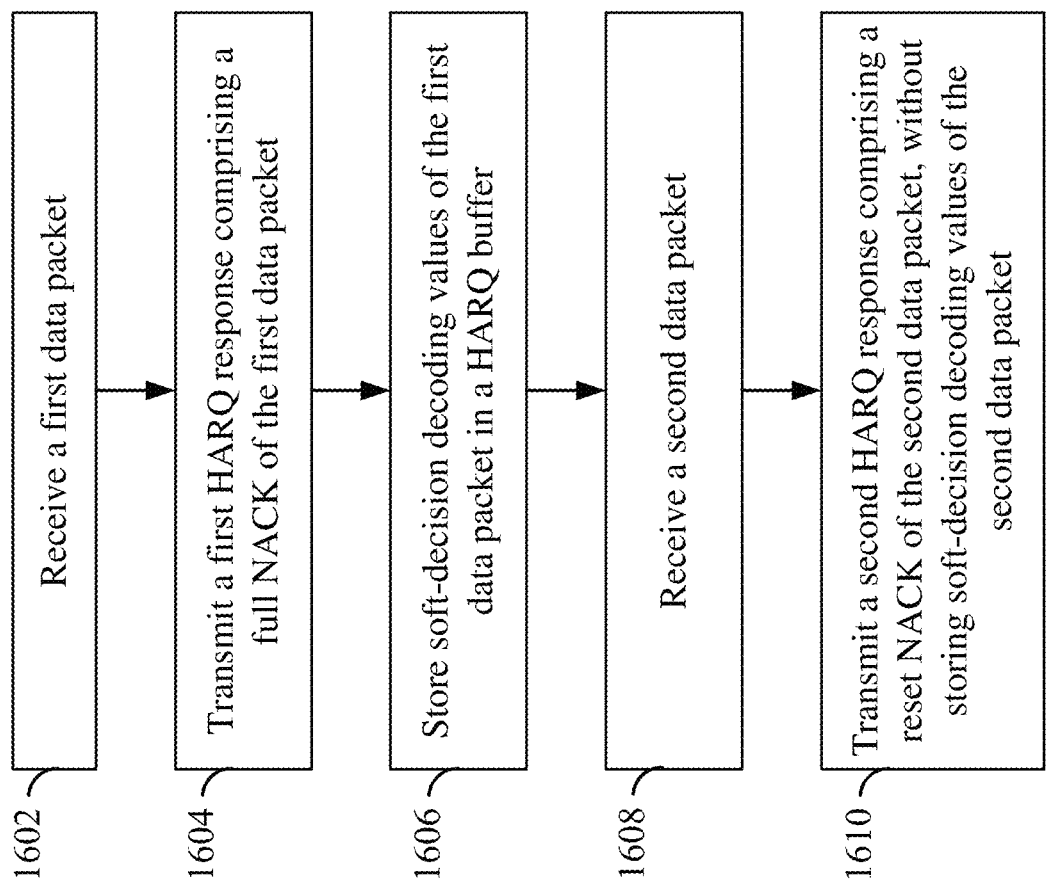
FIG. 16 is a flow chart illustrating an exemplary communication method using HARQ retransmission according to some aspects.

FIG. 16 is a flow chart illustrating an exemplary communication method 1600 using HARQ retransmission in accordance with some aspects of the present disclosure. As described below, some or all illustrated features may be omitted in a particular implementation within the scope of the present disclosure, and some illustrated features may not be required for the implementation of all embodiments. In some examples, the method 1600 may be carried out by the scheduled entity 1500 illustrated in FIG. 15. In some examples, the method 1600 may be carried out by any suitable apparatus or means for carrying out the functions or algorithms described below.

At block 1602, a scheduled entity (e.g., UE) receives a first data packet from a scheduling entity (e.g., gNB). For example, the DL communication circuit 1540 may provide a means to receive a DL data packet from the scheduling entity via a communication interface (e.g., transceiver 1510 of FIG. 15). In one example, the scheduled entity may receive the data via a PDSCH. At block 1604, the scheduled entity transmits a first HARQ response of the DL data packet. For example, the HARQ circuit 1544 may provide a means to determine the first HARQ response (e.g., ACK/NACK) of the first data packet. In one example, the UL communication circuit 1542 may provide a means to transmit the first HARQ response via the transceiver 1510. In one example, the first HARQ response may include a full NACK of the first data packet. The scheduled entity may transmit the HARQ response via a UL channel (e.g., PUCCH or PUSCH). At block 1606, the scheduled entity stores the soft-decision decoding values (e.g., LLRs) of the first data packet in a HARQ buffer. For example, the scheduled entity may store the LLRs in the HARQ buffers 1560 (see FIG. 15).

At block 1608, the scheduled entity receives a second data packet. For example, the scheduled entity may use the DL communication circuit 1540 to receive the second data packet via the transceiver 1510. In some examples, the second data packet may be a HARQ retransmission of a previously transmitted data packet (e.g., a third data packet). At block 1610, the scheduled entity transmits a second HARQ response to the scheduling entity without storing soft-decision decoding values (e.g., LLRs) of the second data packet. For example, the scheduled entity may determine not to store the decoding values in the HARQ buffer. The second HARQ response may include a reset NACK of the second data packet. In one example, the HARQ circuit 1544 may provide a means to determine the second HARQ response (e.g., ACK/NACK) of the second data packet. When the scheduled entity transmits the reset NACK, the soft-decision decoding values (e.g., LLRs) of the second data packet can be discarded and not stored at the scheduled entity. Using the reset NACK allows the scheduled entity to support more concurrent HARQ processes using the available HARQ buffers.

Figure 17:
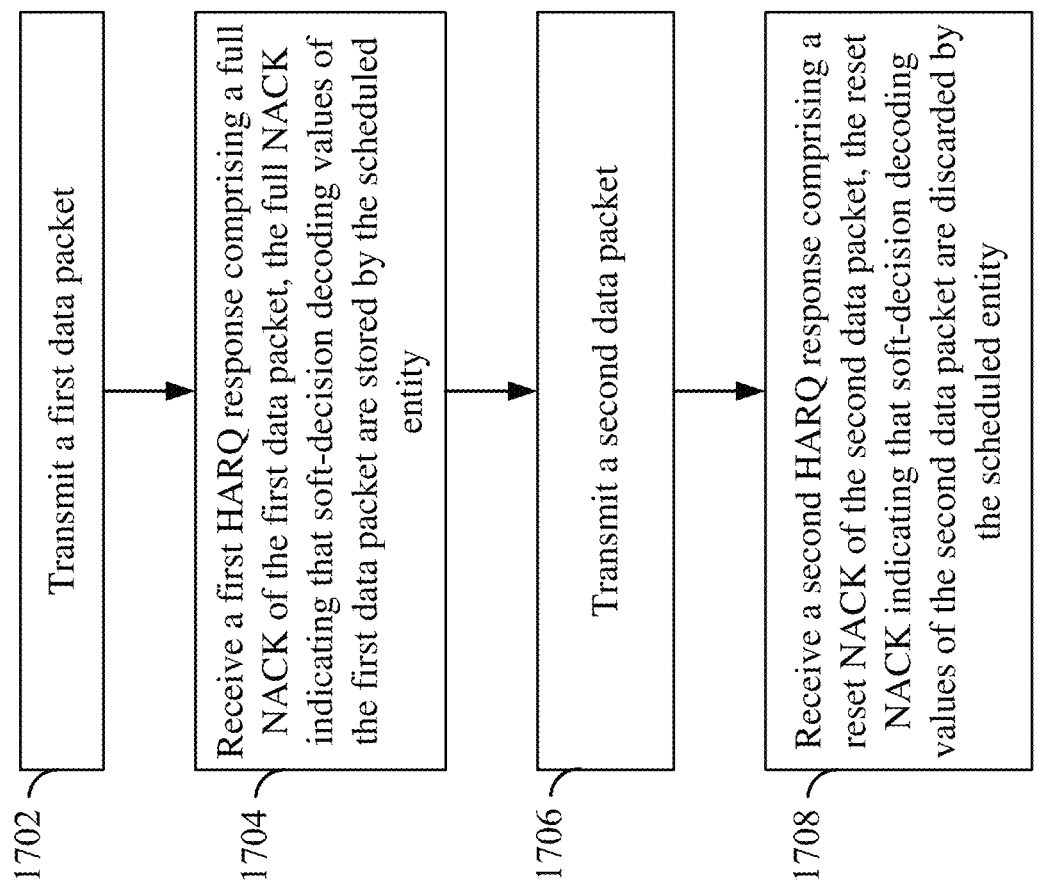
FIG. 17 is a flow chart illustrating another exemplary communication using HARQ retransmission according to some aspects.

FIG. 17 is a flow chart illustrating an exemplary communication method 1700 using HARQ retransmission in accordance with some aspects of the present disclosure. As described below, some or all illustrated features may be omitted in a particular implementation within the scope of the present disclosure, and some illustrated features may not be required for the implementation of all embodiments. In some examples, the method 1700 may be carried out by the scheduling entity 1400 illustrated in FIG. 14. In some examples, the method 1700 may be carried out by any suitable apparatus or means for carrying out the functions or algorithms described below.

At block 1702, a scheduling entity (e.g., gNB) may transmit a first data packet to a scheduled entity (e.g., UE). For example, the DL communication circuit 1440 may provide a means to transmit a DL data packet via a communication interface (e.g., transceiver 1410 of FIG. 14). The scheduling entity may transmit the data packet via a DL channel (e.g., PDSCH). At block 1704, the scheduling entity receives a first HARQ response from the scheduled entity. The first HARQ response may include a full NACK of the first data packet, and the full NACK indicates that the soft-decision decoding values (e.g., LLRs) of the first data packet are stored or retained by the scheduled entity. For example, the UL communication circuit 1442 may provide a means to receive the first HARQ response via the transceiver 1410. The scheduling entity may receive the first HARQ response via a UL channel (e.g., PUCCH).

At block 1706, the scheduling entity transmits a second data packet to the scheduled entity. In some examples, the second data packet may correspond to a HARQ retransmission of a previously transmitted data packet (e.g., the first data packet or a third data packet). The DL communication circuit 1440 may provide a means to transmit the second data packet via the transceiver 1410. In one example, the scheduling entity may use the HARQ circuit 1444 as a means to determine the content of the second data packet (e.g., redundancy version) for a HARQ retransmission. At block 1708, the scheduling entity receives a second HARQ response from the scheduled entity. The second HARQ response may include a reset NACK of the second data packet. The reset NACK can indicate that the soft-decision decoding values (e.g., LLRs) of the second data packet are discarded or not stored by the scheduled entity. The scheduling entity may use the UL communication circuit 1442 as a means to receive the second HARQ response via the transceiver 1410.

In one configuration, the apparatus 1400 and/or 1500 for wireless communication includes means for performing the various functions, processes, and procedures described in this disclosure. In one aspect, the aforementioned means may be the processor(s) 1404 and/or 1405 shown in FIG. 14/15 configured to perform the functions recited by the aforementioned means. In another aspect, the aforementioned means may be a circuit or any apparatus configured to perform the functions recited by the aforementioned means.

Of course, in the above examples, the circuitry included in the processor 1404 and circuitry included in the processor 1504 are merely provided as examples, and other means for carrying out the described functions may be included within various aspects of the present disclosure, including but not limited to the instructions stored in the computer-readable storage medium 1406/1506, or any other suitable apparatus or means described in any one of the FIGS. 1, 2, and/or 3, and utilizing, for example, the processes and/or algorithms described herein in relation to FIGS. 6-13, 16, and/or 17.

The apparatuses and processes described above may include additional aspects, such as any single aspect or any combination of aspects described below and/or in connection with one or more other processes described elsewhere herein.

In a first aspect, a scheduled entity may receive a first data packet from a scheduling entity. The scheduled entity may transmit, to the scheduling entity, a first HARQ response including a full NACK of the first data packet. The scheduled entity may store soft-decision decoding values (e.g., LLRs) of the first data packet in a HARQ buffer. The scheduled entity may further receive, from the scheduling entity, a second data packet. The scheduled entity may transmit, to the scheduling entity, a second HARQ response including a reset NACK of the second data packet, without storing soft-decision decoding values (e.g., LLRs) of the second data packet.

In a second aspect, alone or in combination with the first aspect, the scheduled entity may discard the soft-decision decoding values of the second data packet or soft-decision decoding values of a HARQ process associated with the second data packet.

In a third aspect, alone or in combination with one or more of the first and second aspects, the scheduled entity may determine a signal-to-interference-plus-noise ratio (SINR) of the second data packet by comparing the SINR with a historic SINR of the channel, and determine to transmit the reset NACK based on the signal quality.

In a fourth aspect, alone or in combination with one or more of the first through third aspects, the first data packet and the second data packet may be associated with different HARQ processes, respectively.

In a fifth aspect, alone or in combination with one or more of the first through fourth aspects, the first data packet and the second data packet may be associated with a same HARQ process.

In a sixth aspect, alone or in combination with one or more of the first through fifth aspects, the scheduled entity may determine a potential decoding enhancement of combining the soft-decision decoding values of the second data packet and soft-decision decoding values of one or more data packets that are associated with the second data packet in a same HARQ process; and if no potential decoding enhancement is determined, transmit, to the scheduling entity, the second HARQ response including the reset NACK, without storing the soft-decision decoding values of the second data packet.

In a seventh aspect, alone or in combination with one or more of the first through sixth aspects, the scheduled entity may include receive, from the scheduling entity, a third data packet that is associated with the first data packet in a same HARQ process; determine a potential decoding enhancement of combining the soft-decision decoding values of the first data packet and soft-decision decoding values of the third data packet; and if no potential decoding enhancement is determined, transmit, to the scheduling entity, a third HARQ response including a reset NACK of the third data packet, without storing the soft-decision decoding values of the third data packet.

In an eighth aspect, alone or in combination with one or more of the first through seventh aspects, the scheduled entity may transmit, to the scheduling entity, a capability message that indicates availability of first HARQ buffers and second HARQ buffers, the first HARQ buffers configured to store soft-decision decoding values of data packets received from the scheduling entity, the second HARQ buffers configured to store HARQ response status without corresponding soft-decision decoding values of the data packets.

In a ninth aspect, alone or in combination with one or more of the first through eighth aspects, the scheduled entity may receive, from the scheduling entity, a plurality of data packets respectively in a plurality of HARQ threads that are initiated by the reset NACK, each of the data packets identified by a HARQ process index and a HARQ thread index of the corresponding HARQ thread; and transmit respective HARQ responses of the plurality of data packets without retaining soft-decision decoding values of the plurality of data packets.

In tenth aspect, alone or in combination with one or more of the first through ninth aspects, the scheduled entity may receive, from the scheduling entity, DCI including the HARQ process index and the HARQ thread index.

In an eleventh aspect, a scheduling entity may transmit, to a scheduled entity, a first data packet. The scheduling entity may receive, from the scheduled entity, a first HARQ response including a full NACK of the first data packet, the full NACK indicating that soft-decision decoding values of the first data packet are stored by the scheduled entity. The scheduling entity may transmit, to the scheduled entity, a second data packet. The scheduling entity may receive, from the scheduled entity, a second HARQ response including a reset NACK of the second data packet, the reset NACK indicating that soft-decision decoding values of the second data packet are discarded by the scheduled entity.

In a twelfth aspect, alone or in combination with the eleventh aspect, the scheduling entity may receive, from the scheduled entity, a capability message that indicates availability of first HARQ buffers and second HARQ buffers at the scheduled entity, the first HARQ buffers configured to store soft-decision decoding values of data packets, the second HARQ buffers configured to store HARQ response status without corresponding soft-decision decoding values of the data packets.

In a thirteenth aspect, alone or in combination with the eleventh and twelfth aspects, the scheduling entity may transmit, to the scheduled entity, a plurality of data packets respectively in a plurality of HARQ threads that are initiated by the reset NACK, each of the data packets identified by a HARQ process index and a HARQ thread index of the corresponding HARQ thread.

In a fourteenth aspect, alone or in combination with the eleventh through thirteenth aspects, the scheduling entity may transmit, to the scheduled entity, DCI including the HARQ process index and the HARQ thread index.

In a fifteenth aspect, alone or in combination with the eleventh through fourteenth aspects, the scheduling entity may transmit, to the scheduled entity, a third data packet; receive, from the scheduled entity, a third HARQ response; and selectively transmit a first redundancy version or a second redundancy of the third data packet, depending on whether the third HARQ response comprising a full NACK or reset NACK of the third data packet.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-17 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a user equipment (UE), the method comprising:
   transmitting, to a scheduling entity, a first HARQ response comprising a first negative acknowledgment (NACK) associated with a first data packet, the first NACK configured to indicate that soft-decision decoding values associated the first data packet are stored in a buffer configured to hold HARQ information; and
   transmitting, to the scheduling entity, a second HARQ response comprising a reset NACK associated with a second data packet, the reset NACK configured to indicate that soft-decision decoding values associated with the second data packet are not stored in the buffer.

2. The method of claim 1, further comprising:
   storing the soft-decision decoding values associated with the first data packet in the buffer.

3. The method of claim 1, further comprising:
   determining not to store the soft-decision decoding values associated with the second data packet in the buffer.

4. The method of claim 1, further comprising:
   determining a signal-to-interference-plus-noise ratio (SINR) of the second data packet;
   determining a signal quality of a channel carrying the second data packet by comparing the SINR with a historic SINR of the channel; and determining to transmit the reset NACK based on the signal quality.

5. The method of claim 1, wherein the first data packet and the second data packet are associated with different HARQ processes, respectively.

6. The method of claim 1, wherein the first data packet and the second data packet are associated with a same HARQ process.

7. The method of claim 1, wherein the transmitting the second HARQ response comprises:
determining a potential decoding enhancement of combining the soft-decision decoding values of the second data packet and soft-decision decoding values of one or more data packets that are associated with the second data packet in a same HARQ process; and
if no potential decoding enhancement is determined, transmitting, to the scheduling entity, the second HARQ response comprising the reset NACK, without storing the soft-decision decoding values of the second data packet.

8. The method of claim 1, further comprising:
receiving, from the scheduling entity, a third data packet that is associated with the first data packet in a same HARQ process;
determining a potential decoding enhancement of combining the soft-decision decoding values of the first data packet and soft-decision decoding values of the third data packet; and
if no potential decoding enhancement is determined, transmitting, to the scheduling entity, a third HARQ response comprising a reset NACK of the third data packet, without storing the soft-decision decoding values of the third data packet.

9. The method of claim 1, further comprising:
transmitting, to the scheduling entity, a capability message that indicates availability of first buffers and second buffers at the UE, the first buffers configured to store soft-decision decoding values associated with data packets received from the scheduling entity, and the second buffers configured to store HARQ response status without corresponding soft-decision decoding values of the data packets.

10. The method of claim 1, further comprising:
receiving, from the scheduling entity, a plurality of data packets respectively in a plurality of HARQ threads that are initiated by the reset NACK, each of the data packets identified by a HARQ process index and a HARQ thread index of the corresponding HARQ thread; and
transmitting respective HARQ responses of the plurality of data packets without retaining soft-decision decoding values of the plurality of data packets.

11. The method of claim 10, further comprising:
receiving, from the scheduling entity, downlink control information (DCI) comprising the HARQ process index and the HARQ thread index.

12. A method of wireless communication operable at a scheduling entity, comprising:
transmitting, to a user equipment (UE), a first data packet;
receiving, from the UE, a first hybrid automatic repeat request (HARQ) response comprising a first negative acknowledgment (NACK) of the first data packet, the first NACK indicating that soft-decision decoding values of the first data packet are stored by the UE in a buffer configured to hold HARQ information;
transmitting, to the UE, a second data packet; and
receiving, from the UE, a second HARQ response comprising a reset NACK of the second data packet, the reset NACK indicating that soft-decision decoding values of the second data packet are discarded by the UE.

13. The method of claim 12, further comprising:
receiving, from the UE, a capability message that indicates availability of first HARQ buffers and second HARQ buffers at the UE, the first HARQ buffers configured to store soft-decision decoding values of data packets, the second HARQ buffers configured to store HARQ response status without corresponding soft-decision decoding values of the data packets.

14. The method of claim 12, further comprising:
transmitting, to the UE, a plurality of data packets respectively in a plurality of HARQ threads that are initiated by the reset NACK, each of the plurality of data packets identified by a HARQ process index and a HARQ thread index of the corresponding HARQ thread.

15. The method of claim 14, further comprising:
transmitting, to the UE, downlink control information (DCI) comprising the HARQ process index and the HARQ thread index.

16. The method of claim 12, further comprising:
transmitting, to the UE, a third data packet;
receiving, from the UE, a third HARQ response of the third data packet; and
selectively transmitting a first redundancy version or a second redundancy of the third data packet, depending on whether the third HARQ response comprising a first NACK or reset NACK of the third data packet.

17. A user equipment (UE) for wireless communication comprising:
a communication interface;
a memory; and
a processor coupled to the communication interface and the memory, wherein the processor is configured to:
transmit, via the communication interface to a scheduling entity, a first hybrid automatic repeat request (HARQ) response comprising a first negative acknowledgment (NACK) associated with a first data packet, the first NACK indicating that soft-decision decoding values associated with the first data packet are stored in a buffer configured to hold HARQ information; and
transmit, via the communication interface to the scheduling entity, a second HARQ response comprising a reset NACK associated with a second data packet, the reset NACK configured to indicate that soft-decision decoding values associated with the second data packet are not stored in the buffer.

18. The UE of claim 17, wherein the processor is configured to store the soft-decision decoding values associated with the first data packet in the buffer.

19. The UE of claim 17, wherein the processor is configured to determine not to store the soft-decision decoding values associated with the second data packet in the buffer.

20. The UE of claim 17, wherein the processor is further configured to:
determine a signal-to-interference-plus-noise ratio (SINR) of the second data packet;
determine a signal quality of a channel carrying the second data packet by comparing the SINR with a historic SINR of the channel; and
determine to transmit the reset NACK based on the signal quality.

21. The UE of claim 17, wherein the first data packet and the second data packet are associated with different HARQ processes, respectively.

22. The UE of claim 17, wherein the first data packet and the second data packet are associated with a same HARQ process.

23. The UE of claim 17, wherein the processor is further configured to:
   determine a potential decoding enhancement of combining the soft-decision decoding values of the second data packet and soft-decision decoding values of one or more data packets that are associated with the second data packet in a same HARQ process; and
   if no potential decoding enhancement is determined, transmit, to the scheduling entity, the second HARQ response comprising the reset NACK, without storing the soft-decision decoding values of the second data packet.

24. The UE of claim 17, wherein the processor is further configured to:
   receive, via the communication interface from the scheduling entity, a third data packet that is associated with the first data packet in a same HARQ process;
   determine a potential decoding enhancement of combining the soft-decision decoding values of the first data packet and soft-decision decoding values of the third data packet; and
   if no potential decoding enhancement is determined, transmit, to the scheduling entity, a third HARQ response comprising a reset NACK of the third data packet, without storing the soft-decision decoding values of the third data packet.

25. The UE of claim 17, wherein the processor is further configured to:
   transmit, via the communication interface to the scheduling entity, a capability message that indicates availability of first HARQ buffers and second HARQ buffers, the first HARQ buffers configured to store soft-decision decoding values of data packets received from the scheduling entity, and the second HARQ buffers configured to store HARQ response status without corresponding soft-decision decoding values of the data packets.

26. The UE of claim 17, wherein the processor is further configured to:
   receive, via the communication interface from the scheduling entity, a plurality of data packets respectively in a plurality of HARQ threads that are initiated by the reset NACK, each of the data packets identified by a HARQ process index and a HARQ thread index of the corresponding HARQ thread; and
   transmit, via the communication interface from the scheduling entity, respective HARQ responses of the plurality of data packets without retaining soft-decision decoding values of the plurality of data packets.

27. The UE of claim 26, wherein the processor is further configured to:
   receive, via the communication interface from the scheduling entity, downlink control information (DCI) comprising the HARQ process index and the HARQ thread index.

28. A scheduling entity for wireless communication comprising:
   a communication interface;
   a memory; and
   a processor operatively coupled to the communication interface and the memory, wherein the processor is configured to:
      transmit, via the communication interface to a user equipment (UE), a first data packet;
      receive, via the communication interface from the UE, a first HARQ response comprising a first negative acknowledgment (NACK) of the first data packet, the first NACK configured to indicate that soft-decision decoding values of the first data packet are stored by the UE in a buffer configured to hold HARQ information;
      transmit, via the communication interface to the UE, a second data packet; and
      receive, via the communication interface from the UE, a second HARQ response comprising a reset NACK of the second data packet, the reset NACK configured to indicate that soft-decision decoding values of the second data packet are discarded by the UE.

29. The scheduling entity of claim 28, wherein the processor is further configured to:
   receive, via the communication interface from the UE, a capability message that indicates availability of first HARQ buffers and second HARQ buffers at the UE, the first HARQ buffers configured to store soft-decision decoding values of data packets, the second HARQ buffers configured to store HARQ response status without corresponding soft-decision decoding values of the data packets.

30. The scheduling entity of claim 28, wherein the processor is further configured to:
   transmit, via the communication interface to the UE, a plurality of data packets respectively in a plurality of HARQ threads that are initiated by the reset NACK, each of the plurality of data packets identified by a HARQ process index and a HARQ thread index of the corresponding HARQ thread.

31. The scheduling entity of claim 30, wherein the processor is further configured to:
   transmit, via the communication interface to the UE, downlink control information (DCI) comprising the HARQ process index and the HARQ thread index.

32. The scheduling entity of claim 28, wherein the processor is further configured to:
   transmit, via the communication interface to the UE, a third data packet;
   receive, via the communication interface from the UE, a third HARQ response of the third data packet; and
   selectively transmit, via the communication interface, a first redundancy version or a second redundancy of the third data packet, depending on whether the third HARQ response comprising a full NACK or reset NACK of the third data packet.

33. A wireless communication method, comprising:
   receiving at least one wireless communication packet from at least one other wireless entity using a hybrid automatic repeat request (HARQ) process; and
   transmitting, to the other wireless entity, a HARQ response comprising a reset NACK without keeping soft-decision decoding values associated with the wireless communication packet for later soft combining in the HARQ process.

34. The wireless communication method of 33, further comprising:
   determining not to store the soft-decision decoding values in a buffer configured to store HARQ information, based on a plurality of factors.

35. The wireless communication method of 33, further comprising:
- receiving, from the other wireless entity, a plurality of wireless communication packets using a light HARQ process comprising a plurality of light HARQ threads; and
- transmitting a HARQ feedback in each of the light HARQ threads without keeping corresponding soft-decision decoding values of the plurality of wireless communication packets.

* * * * *